US008004945B2

(12) United States Patent
Miyashita et al.

(10) Patent No.: US 8,004,945 B2
(45) Date of Patent: Aug. 23, 2011

(54) RECORDING MEDIUM ACCESS DEVICE

(75) Inventors: Harumitsu Miyashita, Nara (JP); Kohei Nakata, Nara (JP); Hiroshi Ueda, Nara (JP); Youichi Ogura, Osaka (JP)

(73) Assignee: Panasonic Corporation, Osaka (JP)

( * ) Notice: Subject to any disclaimer, the term of this patent is extended or adjusted under 35 U.S.C. 154(b) by 351 days.

(21) Appl. No.: 12/282,439

(22) PCT Filed: Mar. 13, 2007

(86) PCT No.: PCT/JP2007/054945
§ 371 (c)(1),
(2), (4) Date: Sep. 10, 2008

(87) PCT Pub. No.: WO2007/105723
PCT Pub. Date: Sep. 20, 2007

(65) Prior Publication Data
US 2009/0028019 A1 Jan. 29, 2009

(30) Foreign Application Priority Data

Mar. 13, 2006 (JP) ................................. 2006-067162

(51) Int. Cl.
*G11B 7/00* (2006.01)
(52) U.S. Cl. ..................................................... 369/53.34
(58) Field of Classification Search .................... None
See application file for complete search history.

(56) References Cited

U.S. PATENT DOCUMENTS

| 5,666,336 A * | 9/1997 | Yoshida ....................... 369/30.11 |
| 5,978,333 A * | 11/1999 | Kobayashi et al. ........ 369/44.41 |
| 6,104,682 A | 8/2000 | Konishi |
| 6,167,022 A * | 12/2000 | Ishida et al. ................ 369/275.3 |
| 6,172,954 B1 * | 1/2001 | Masuda ....................... 369/47.26 |
| 6,339,571 B1 * | 1/2002 | Torazawa et al. ............ 369/53.2 |
| 6,678,230 B2 | 1/2004 | Miyashita et al. |
| 6,754,152 B2 * | 6/2004 | Kando et al. ................ 369/47.54 |
| 6,807,134 B2 | 10/2004 | Nakajima et al. |
| 7,099,244 B2 | 8/2006 | Nakata et al. |
| 2003/0012103 A1 * | 1/2003 | Sako et al. ................. 369/47.54 |
| 2003/0025545 A1 | 2/2003 | Park et al. |

(Continued)

FOREIGN PATENT DOCUMENTS

JP 11-16295 1/1999

(Continued)

OTHER PUBLICATIONS

International Search Report for corresponding Application No. PCT/JP2007/054945 dated Jun. 5, 2007.

*Primary Examiner* — Peter Vincent Agustin
(74) *Attorney, Agent, or Firm* — Renner, Otto, Boisselle & Sklar, LLP

(57) ABSTRACT

An information reproduction device according to the present invention is a device for accessing a recording medium having first address information and second address information recorded thereon. The first address information is represented by a shape formed on the recording medium in advance; and the second address information is recorded on the recording medium together with data. The information reproduction device includes a head section for accessing the recording medium to generate a reproduction signal; a first detection section for detecting the first address information from the reproduction signal; a second detection section for detecting the second address information from the reproduction signal; and a control section for, based on a detection result of either the first detection section or the second detection section which detected the address information first, controlling an access after the detection to the recording medium.

24 Claims, 21 Drawing Sheets

U.S. PATENT DOCUMENTS

| | | |
|---|---|---|
| 2003/0067998 A1 | 4/2003 | Nakajima et al. |
| 2004/0264325 A1* | 12/2004 | Fukushima et al. ....... 369/47.27 |
| 2007/0121459 A1* | 5/2007 | Hirayama et al. ......... 369/53.34 |
| 2009/0028019 A1* | 1/2009 | Miyashita et al. ........... 369/53.2 |

FOREIGN PATENT DOCUMENTS

| | | |
|---|---|---|
| JP | 2000-100083 | 4/2000 |
| JP | 2000-113597 | 4/2000 |
| JP | 2001-250341 | 9/2001 |
| JP | 2001-351311 | 12/2001 |
| JP | 2002-216346 | 8/2002 |
| JP | 2003-059205 | 2/2003 |
| JP | 2003-085764 | 3/2003 |
| JP | 2003-141823 | 5/2003 |
| JP | 2004-134009 | 2/2004 |
| JP | 2004-134009 | 4/2004 |

* cited by examiner (a) SAMPLING DATA SIGNAL (b) DATA PHASE ERROR VALUE (a)

(b)

(a)

(b)

|  | ADIP/AUN |
|---|---|
| PLL PULL-IN PERIOD | 1 |
| ADDRESS SYNCHRONIZATION PERIOD | 1 |
| ADDRESS CONTINUITY CHECKING PERIOD | 2 |
| TOTAL PERIOD REQUIRED FOR ADDRESS RECOGNITION | 4 |

RECORDING MEDIUM ACCESS DEVICE

TECHNICAL FIELD

The present invention relates to a device for accessing a recording medium using at least one of address information represented by a shape formed on the recording medium in advance and address information recorded on the recording medium together with data.

BACKGROUND ART

Conventionally, a recordable optical recording medium has a track groove formed in advance, and data is recorded along the track groove, namely, on the track groove or on an area sandwiched between the track grooves (land). The track groove winds like a sine wave, and the data is recorded in synchronization with a recording clock signal which is generated based on a wobble cycle of the sine wave. A clock signal synchronized to a wobble cycle is generally generated using a PLL (Phase Locked Loop) (see, for example, Patent Document 1).

In order to record data at a prescribed position on a recording surface of the optical disc medium, an ADIP (Address in Pregroove) is formed along the track groove. Known methods for writing address information include a PSK (Phase Shift Keying) modulation system and an MSK (Minimum Shift Keying) modulation system (see, for example, Patent Document 2).

For reproducing data recorded on the track, the PLL generates a reproduction clock signal synchronized to a data signal which is included in a reproduction signal from the optical disc medium. The data signal is digitized in synchronization with the reproduction clock signal, and data is reproduced from the digital data (see, for example, Patent Document 3).

FIG. 22 is a block diagram showing an optical disc device for making a recording access and a reproduction access. An optical disc medium 100 has a wobbling track, and data is recorded on the track. An optical head section 101 directs laser light toward the optical disc medium 100 and detects an amount of the light reflected by the optical disc medium 100 to output an electric signal. An analog signal processing section 104 extracts a wobble signal, a data signal and a servo error signal from the electric signal.

A motor 102 rotates the optical disc medium 100. A servo circuit 103 controls the position to which the optical head section 101 directs the laser light and the rotation rate of the motor 102 based on a servo error signal.

A reproduction signal processing circuit 207 generates a recording clock signal and a reproduction clock signal from a wobble (WBL) signal, detects address information, generates a reproduction clock signal from a data signal (RF signal), and reproduces user data. An ADIP reproduction section 213 detects an ADIP recorded by the PSK modulation system or the MSK modulation system and reproduces address information.

Based on the address information reproduced by the reproduction signal processing circuit 207, a recording and reproduction timing control section 208 controls a timing for recording data on the optical disc medium 100 and a timing for reproducing data from the optical disc medium 100. A CPU 209 controls recording and reproduction operations of the optical disc device via the recording and reproduction timing control section 208.

A data modulation section 106 modulates user data to be recorded on the optical disc medium 100. A power control section 105 controls the power of the laser light from the optical head section 101. For recording, the power control section 105 controls the power of the laser light in accordance with the data signal which is output by the data modulation section 106.

Next, the reproduction signal processor 207 will be described in more detail. The reproduction signal processor 207 receives a wobble signal WBL and a data signal RF from the analog signal processing section 104, and outputs address information to the recording and reproduction timing control section 208. Based on the address information, the recording and reproduction timing control section 208 outputs a timing signal representing the reproduction timing to a data reproduction section 219. In accordance with the timing signal, the data reproduction section 219 reproduces user data.

The reproduction signal processor 207 includes an A/D converter 211 for performing analog/digital conversion of a wobble signal, a PLL circuit 212 for generating a clock signal synchronized to the wobble signal, an ADIP reproduction section 213, an A/D converter 214 for performing analog/digital conversion of a data signal, an AGC circuit 215, a PLL circuit 216 for generating a clock signal synchronized to the data signal, a PR equalization filter 217, a viterbi decoding section 218, and a data reproduction section 219.

The A/D converter 211 samples a wobble signal WBL in synchronization with the clock signal generated by the PLL circuit 212. The ADIP reproduction section 213 detects a wobble modulation mark by the MSK modulation system from a digital wobble signal obtained by the sampling and reproduces address information. The A/D converter 214 samples a data signal RF in synchronization with the clock signal generated by the PLL circuit 216, and the sampled data signal is input to the equalization filter section 217.

The AGC circuit 215 feeds amplitude error information back to the analog signal processing section 104 and performs a control such that the amplitude of a data signal to be input to the A/D converter 214 is kept constant. The PR equalization filter section 217 performs a desired partial response equalization on a digital data signal synchronized to the clock signal generated by the PLL circuit 216, using a coefficient obtained by equalization coefficient optimization processing by an adaptive equalization algorithm. The viterbi decoding section 218 performs likelihood decoding in accordance with the type of the partial response performed by the PR equalization filter section 217 and outputs a data binary signal. The data reproduction section 219 demodulates the data binary signal in accordance with a prescribed modulation system at the timing specified by the recording and reproduction timing control section 208, performs error correction processing and outputs reproduction user data.

Next, technologies used for the PR equalization filter section 217 and the viterbi decoding section 218 will be described.

Conventionally, in an information reproduction device for reproducing information recorded on a recording medium such as an optical disc medium or the like, a slice system has been adopted. According to the slice system, when the wave level of a signal is determined as "1" when being higher than a prescribed value and determined as "0" when being lower than the prescribed value. However, with this system, it is difficult to reproduce data at high reliability for a recording medium having a significantly improved recording density. Accordingly, a PRML (Partial Response Maximum Likelihood) system capable of reproducing data at high reliability has recently been a target of attention. The PRML system is used as a high density signal processing technology for recording mediums such as an HDD (hard disc drive), a camera-integrated VTR capable of digital recording, a recordable and rewritable optical disc medium and the like. As the recording density is improved, it is now strongly required to decode data accurately from a reproduction signal having a low S/N (signal to noise) ratio or a nonlinear reproduction signal. There are various PR systems, and a PR system suitable to the characteristics of each transmission path needs to be selected. In a reproduction transmission path of an optical disc medium or the like, PR(1,2,2,1) characteristic is occasionally adopted, for example.

FIG. 23 is a block diagram showing the PR equalization filter section 217. The filter shown in FIG. 23 is referred to as a transversal filter or an FIR (Finite Impulse Response) filter. The PR equalization filter section 217 generally includes a plurality of delay elements 300 through 305, a plurality of multipliers 306 through 312 for multiplying outputs from the delay elements 300 through 305 by a plurality of equalization coefficients (coefficients P through V) for realizing a desired PR characteristic, and an adder 313 for adding together outputs from the plurality of multipliers 306 through 312.

In order to realize equalization to a desired PR characteristic with high precision, a technology of automatically performing an adaptation control on an equalization coefficient (tap) of the FIR filter is adopted. This technology is effective to various stresses at the time of reproduction (tilt of the disc, defocus of the laser light, off-track of the optical head section, etc.). Many algorithms for the adaptation control are known, for example, an LMS (Least-Mean Square) algorithm, a Normalized LMS algorithm, an RLS (Recursive Least Square) algorithm, a projection algorithm, a neural network algorithm and the like.

Now, an adaptive wave equalizer using the LMS algorithm will be described briefly. This algorithm requires a temporary determination value used in LMS in order to calculate an adaptive equalization coefficient. The LMS algorithm is a feedback operation of minimizing the square error between the "desirable response" and the "response of the transmission path". The "desirable response" is a PR equalization target value. The "response of the transmission path" is a digital reproduction signal which is input from the FIR filter and equalized to have a PR frequency characteristic. In the LMS algorithm, a signal, which is obtained in a block of performing an adaptation control on the FIR filter coefficient and represents the difference between the temporary determination value and the post-equalization digital reproduction signal value, is referred to as an "equalization error signal".

The block of performing an adaptation control on the FIR filter coefficient updates the FIR filter equalization coefficient when necessary, in order to minimize the square value of the equalization error signal. This is referred to as "adaptive equalization". An expression for setting the equalization coefficient of LMS is represented by expression (1) as follows (see, for example, Patent Document 4).

$$w(n(T+1))=w(nT)+A \cdot e(nT) \cdot x(nT) \quad \text{expression (1)}$$

(where T=0, 1, 2, 3, . . . )

w(nT) is the current coefficient, w(n(T+1)) is the updated coefficient, A is the tap gain, e(nT) is the equalization error, and x(nT) is the signal input to the FIR filter. n is the parameter for selecting the updating cycle of the coefficient. The equalization coefficient of the FIR filter is updated as represented by expression 1.

Patent Document 1: Japanese Laid-Open Patent Publication No. 2000-113597

Patent Document 2: Japanese Laid-Open Patent Publication No. 2004-134009

Patent Document 3: Japanese Laid-Open Patent Publication No. 2000-100083

Patent Document 4: Japanese Laid-Open Patent Publication No. 2003-85764

Patent Document 5: Japanese Laid-Open Patent Publication No. 2001-250341

Patent Document 6: Japanese Laid-Open Patent Publication No. 2003-141823

DISCLOSURE OF THE INVENTION

Problems to be Solved by the Invention

However, the conventional optical disc device has the following three problems and thus cannot easily realize a high-speed and stable reproduction access.

A first problem is that because only address information obtained by reproduction of an ADIP is used, it is impossible to detect the address information at high speed to access a target address position.

FIG. 24 shows an exemplary format of an optical disc medium. With reference to FIG. 24, time flows of detecting ADIP address information and an AUN (Address Unit Number) address inserted into user data will be described. In FIG. 24(a), the horizontal axis represents the track direction (time axis direction), and "RUB" represents one block unit for error correction of the user data. Regarding each of an ADIP address information unit and an AUN address information unit, a time axis required to recognize one address unit is represented as one box. As shown in the table of FIG. 24(b), where the system requires three types of step periods, i.e., a PLL pull-in period, an address synchronization period, and an address continuity checking period in order to confirm the current address from the address information, 4 ADIP periods or 4 AUN periods are necessary in this example.

With reference to FIG. 24(a), it is assumed that position (A) is the on-track position (the position obtained as a result of focusing and tracking). In the case where the ADIP address information is used, the address is confirmed at position (C). By contrast, in the case where the AUN address information is used, the address can be confirmed at position (B). ADIP address information is generally formed as being more dispersed than AUN address information, and so requires a longer time for address recognition. This example is an ideal overview, and the address recognition position may be shifted forward and backward depending on the pull-in state of the PLL or the like. In an access to an address position in which the head position moves (traverse movement), the target address position is reached, in general, while address position checking operations are performed a plurality of times (because the positional precision is poor with the traverse movement, the access is made while checking addresses of a plurality of positions). Therefore, when one address recognition time is longer, the access time is longer in proportion thereto.

A second problem is that in the case of an access using AUN address information, the AUN address information occasionally may not be obtained stably in the following areas of the optical disc medium as follows. In an optical disc medium having unrecorded areas and recorded areas in a mixed state, and in an OPC area (a test recording area used for adjustment of the recording waveform such as the recording power or the like), the recording quality may not necessarily be guaranteed or data may be recorded with a special recording pattern with no AUN inserted. Even in the case of an access using ADIP address information, the operation of the AGC 215 or the PLL 216 (FIG. 22) occasionally becomes unstable in an access to an area where the recording quality is not stable.

A third problem is that when the adaptive equalization algorithm used in the PR equalization filter section 217 (FIG. 22) fails by an external disturbance such as a scratch, a fingerprint or the like on the track, it is difficult to recover the system at high speed with no erroneous detection.

The present invention made in light of the above-described problems has an object of providing a device realizing a high-speed and stable access.

Means for Solving the Problems

An information reproduction device according to the present invention is a device for accessing a recording medium having first address information and second address information recorded thereon. The first address information is represented by a shape formed on the recording medium in advance. The second address information is recorded on the recording medium together with data. The device includes a head section for accessing the recording medium to generate a reproduction signal; a first detection section for detecting the first address information from the reproduction signal; a second detection section for detecting the second address information from the reproduction signal; and a control section for, based on a detection result of either the first detection section or the second detection section which detected the address information first, controlling an access after the detection to the recording medium.

According to an embodiment, the control section controls the access to the recording medium based on the detection result on either the first address information or the second address information which was detected first, until an address within a prescribed range from a target address is reached.

According to an embodiment, the control section changes a number of jumps performed during a movement of the head section, between when the access is made based on the detection result of the first detection section and when the access is made based on the detection result of the second detection section.

According to an embodiment, the recording medium is of a recording format which permits a recorded area and an unrecorded area to be present in a mixed state.

According to an embodiment, the head section moves in a radial direction of the recording medium until reaching the address in the prescribed range from the target address.

According to an embodiment, when an address detected in an accessed area is beyond the target address in the access made based on the detection result of one of the first detection section and the second detection section, the control section switches the access to an access based on the detection result of the other of the first detection section and the second detection section.

According to an embodiment, for controlling a measure access, an unrecorded area detection access and a recording access, the control section uses the detection result of the first detection section after the address within the prescribed range from the target address is reached.

According to an embodiment, in the case where the target address is an address in a test recording area, until the test recording area is reached, the control section controls the access to the recording medium based on the detection result on either the first address information or the second address information which was detected first; and after the test recording area is reached, the control section controls the access based on the detection result on the first address information.

According to an embodiment, when the detection result of the first detection section and the detection result of the second detection section are different from each other after the address within the prescribed range from the target address is reached, the control section controls the access after the detection to the recording medium based on the detection result of the first detection section.

According to an embodiment, the head section moves in a radial direction of the recording medium until reaching the address in the prescribed range from the target address.

According to an embodiment, the control section changes a number of jumps performed during a movement of the head section, between when the access is made based on the detection result of the first detection section and when the access is made based on the detection result of the second detection section.

According to an embodiment, the recording medium is of a recording format which permits a recorded area and an unrecorded area to be present in a mixed state.

According to an embodiment, when an address detected in an accessed area is beyond the target address in the access made based on the detection result of one of the first detection section and the second detection section, the control section switches the access to an access based on the detection result of the other of the first detection section and the second detection section.

An information reproduction method according to the present invention is a method for accessing a recording medium having first address information and second address information recorded thereon. The first address information is represented by a shape formed on the recording medium in advance. The second address information is recorded on the recording medium together with data. The method includes the steps of accessing the recording medium to generate a reproduction signal; detecting the first address information from the reproduction signal; detecting the second address information from the reproduction signal; and based on either the first address information or the second address information which was detected first, controlling an access after the detection to the recording medium.

An access control device according to the present invention is a control device for controlling an access to a recording medium having first address information and second address information recorded thereon. The first address information is represented by a shape formed on the recording medium in advance. The second address information is recorded on the recording medium together with data. Based on either the first address information or the second address information which was detected first, the control device controls an access after the detection to the recording medium.

An access control method according to the present invention is a control method for controlling an access to a recording medium having first address information and second address information recorded thereon. The first address information is represented by a shape formed on the recording medium in advance. The second address information is recorded on the recording medium together with data. The control method includes the step of, based on either the first address information or the second address information which was detected first, controlling an access after the detection to the recording medium.

An access control program according to the present invention is a program for causing a computer to execute control processing of controlling an access to a recording medium having first address information and second address information recorded thereon. The first address information is represented by a shape formed on the recording medium in advance. The second address information is recorded on the recording medium together with data. The control processing includes the step of, based on either the first address information or the second address information which was detected first, controlling an access after the detection to the recording medium.

An information reproduction device according to the present invention is a device for accessing a recording medium having first address information and second address information recorded thereon. The first address information is represented by a shape formed on the recording medium in advance. The second address information is recorded on the recording medium together with data. The device includes a head section for accessing the recording medium to generate a reproduction signal; a first PLL section for generating a first clock signal synchronized to a reproduction signal including the first address information; a second PLL section for generating a second clock signal synchronized to a reproduction signal including the second address information; and a control section for controlling the second PLL section. The second PLL section receives the first clock signal. The control section switches between the reproduction signal and the first clock signal as the signal to which a phase of the second clock signal is to be synchronized.

According to an embodiment, the control section switches between the signals depending on whether the target area of the access is an unrecorded area or a recorded area.

According to an embodiment, the control section switches between the signals depending on whether the accessed position is within or outside the target area of the access.

According to an embodiment, for making a measure access, the control section synchronizes the phase of the second clock signal to the reproduction signal when the accessed position is within the target area of the access, and synchronizes the phase of the second clock signal to the first clock signal when the accessed position is outside the target area of the access.

According to an embodiment, the control section switches between the signals depending on a reproduction state of the data recorded on the recording medium.

According to an embodiment, the control section determines whether the target area of the access is an unrecorded area or a recorded area based on an envelope signal included in the reproduction signal.

According to an embodiment, the control section switches between the signals depending on a reproduction state of the data recorded on the recording medium.

According to an embodiment, the control section switches between the signals depending on whether the accessed position is within or outside the target area of the access.

According to an embodiment, for making a measure access, the control section synchronizes the phase of the second clock signal to the reproduction signal when the accessed position is within the target area of the access, and synchronizes the phase of the second clock signal to the first clock signal when the accessed position is outside the target area of the access.

According to an embodiment, the control section determines whether the target area of the access is an unrecorded area or a recorded area based on an envelope signal included in the reproduction signal.

An information reproduction method according to the present invention is a method for accessing a recording medium having first address information and second address information recorded thereon. The first address information is represented by a shape formed on the recording medium in advance. The second address information is recorded on the recording medium together with data. The method includes the steps of accessing the recording medium to generate a reproduction signal; generating a first clock signal synchronized to a reproduction signal including the first address information; generating a second clock signal synchronized to a reproduction signal including the second address information; and switching between the reproduction signal and the first clock signal as the signal to which a phase of the second clock signal is to be synchronized.

An access control device according to the present invention is a control device for controlling an access to a recording medium having first address information and second address information recorded thereon. The first address information is represented by a shape formed on the recording medium in advance. The second address information is recorded on the recording medium together with data. The control device controls a switch between the reproduction signal from the recording medium and the first clock signal synchronized to the reproduction signal including the first address information as the signal to which a phase of the second clock signal used for data reproduction is to be synchronized.

An access control method according to the present invention is a control method for controlling an access to a recording medium having first address information and second address information recorded thereon. The first address information is represented by a shape formed on the recording medium in advance. The second address information is recorded on the recording medium together with data. The control method includes the step of controlling a switch between the reproduction signal from the recording medium and the first clock signal synchronized to the reproduction signal including the first address information as the signal to which a phase of the second clock signal used for data reproduction is to be synchronized.

An access control program according to the present invention is a program for causing a computer to execute control processing of controlling an access to a recording medium having first address information and second address information recorded thereon. The first address information is represented by a shape formed on the recording medium in advance. The second address information is recorded on the recording medium together with data. The control processing includes the step of controlling a switch between the reproduction signal from the recording medium and the first clock signal synchronized to the reproduction signal including the first address information as the signal to which a phase of the second clock signal used for data reproduction is to be synchronized.

Effects of the Invention

According to the present invention, at least one of the first address information represented by a shape formed on the recording medium in advance and the second address information recorded on the recording medium together with data is used to access the recording medium. Based on which of the first address information and the second address information is first detected, the access after the detection to the recording medium is controlled. By this, a high-speed and stable access can be realized.

According to the present invention, the reproduction signal processing control is optimally controlled for each type of access, for example, each of a read access, a measure access, an unrecorded area detection access and the like. By this, a high-speed and stable access can be realized. Even if the reproduction signal processor becomes unstable during the access, the recovery processing is optimized. Thus, a high-speed and stable access can be realized.

DESCRIPTION OF THE REFERENCE NUMERALS

Figure 1:
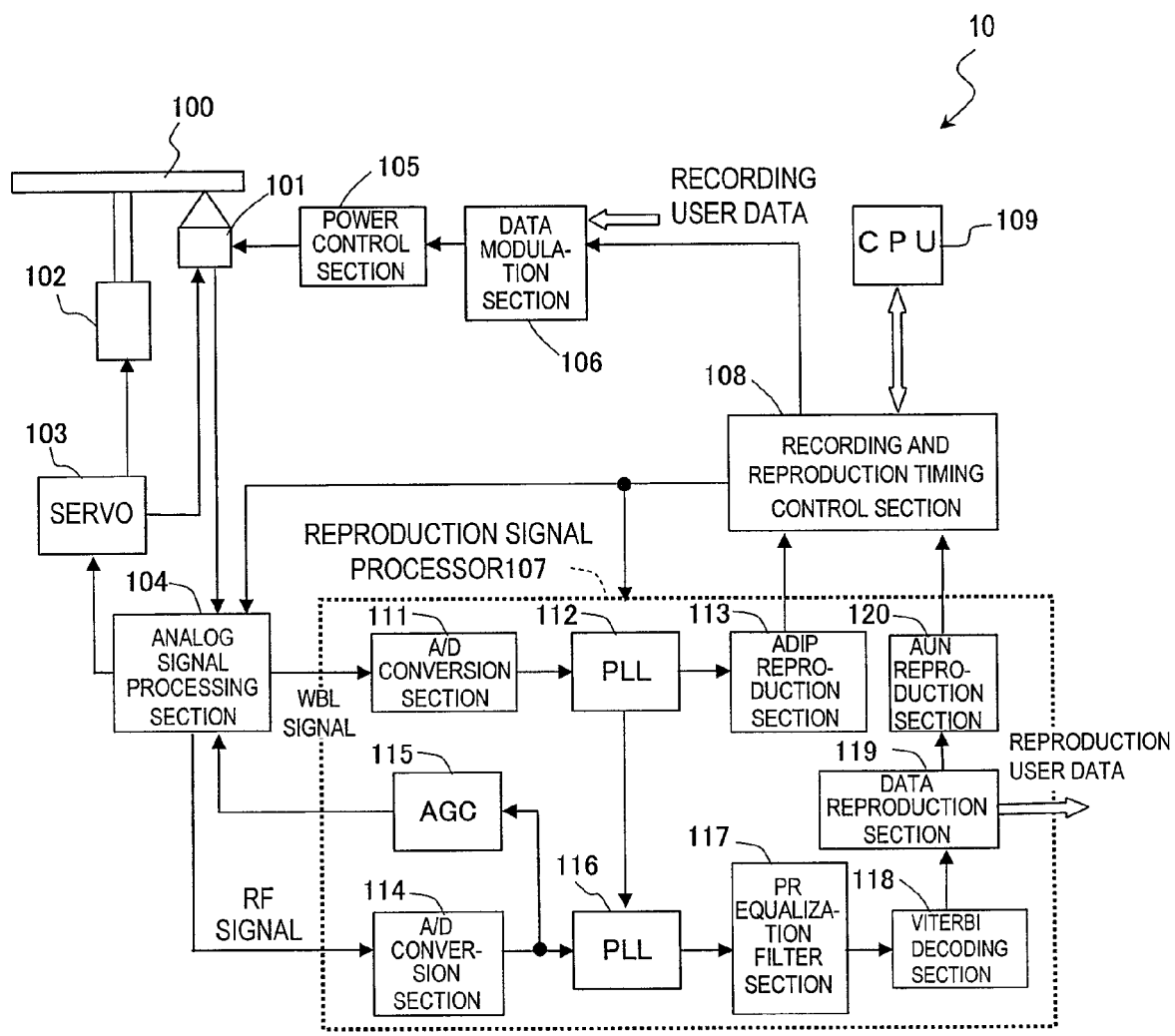
FIG. 1 shows an optical disc device according to an embodiment of the present invention.

10 Optical disc device
100 Optical disc medium
101 Optical head section
102 Motor
103 Servo circuit
104 Analog signal processing section
105 Power control section
106 Data modulation section
107 Reproduction signal processor
108 Recording and reproduction timing control section
109 CPU
111 Wobble signal A/D converter
112 Wobble signal PLL circuit
113 ADIP reproduction section
114 Data signal A/D converter
115 AGC circuit
116 Data signal PLL circuit
117 PR equalization filter section
118 Viterbi decoding section
119 Data reproduction section
120 AUN reproduction circuit
201 DC control circuit
202 Frequency error detection circuit
203 Frequency control loop filter control circuit
204 Phase error detection circuit
205 Phase control loop filter control circuit
206 VCO
300, 301, 302, 303, 304, 305 Delay device
306, 307, 308, 309, 310, 311, 312 Multiplier
313, 402 Adder
401 Multiplier
403 Delay device
701 FIR filter circuit
702 Error detection circuit
703 Correlation detection circuit
704 Loop gain setting circuit
705, 801 Coefficient arithmetic operation circuit
802 Initial coefficient updating value retaining circuit
803 Initial coefficient retaining circuit

BEST MODE FOR CARRYING OUT THE INVENTION

Hereinafter, embodiments of the present invention will be described with reference to the drawings. Like elements bear like reference numerals, and substantially the same description will not be repeated.

Embodiment 1

FIG. 1 is a block diagram showing an optical disc device 10 according to a first embodiment of the present invention.

The optical disc device 10 reproduces data from an optical disc medium 100 or records data on the optical disc medium 100, using a reproduction signal reproduced from the optical disc medium 100 having information recorded thereon. The optical disc device 10 includes an optical head section 101, a motor 102, a servo circuit 103, an analog signal processing section 104, a power control section 105, a data modulation section 106, a reproduction signal processor 107, a recording and reproduction timing control section 108, and a CPU 109.

The optical disc medium 100 has a track wobbling at a prescribed cycle, and data is recorded on the track in accordance with a prescribed data format. In order to record data at a prescribed position of a recording surface of the optical disc medium 100, an ADIP is formed along the track. An ADIP represents address information by locating wobble modulation marks of a shape based on at least one of the MSK modulation system and an STW (Saw-Tooth-Wobble) modulation system, in accordance with a prescribed format. An ADIP may be formed by other systems such as a CAPA (Complementary Allocated Pit Address) system, an LPP (Land-Pre-Pit) system and the like. As described above, ADIP address information is represented by a shape formed on the optical disc medium 100 in advance, and is represented by, for example, a wobbling shape of the track.

FIG. 5(a) shows an exemplary data format of information to be recorded on the optical disc medium 100. User data to be recorded is modulated so as to form sectors in accordance with a prescribed modulation system, and is recorded on the optical disc medium 100 with 16 sectors being as one unit. At a termination position of the data already recorded and at a start position of data to be newly recorded following the already recorded data, a buffer area is provided for each recording unit. By this, when data is to be continuously reproduced, even if the phases of recording units of the reproduction signal are not continuous, while the buffer area is processed, the subsequent sector is prepared to be stably reproduced. Hence, it is not necessary to, when data is to be newly recorded, align the phase of the data to be newly recorded and the phase of the data already recorded immediately before.

The optical head section 101 accesses the optical disc medium 100 and generates a reproduction signal. The optical head section 101 directs laser light toward the optical disc medium 100, and while scanning the track, detects the amount of the light reflected by the optical disc medium 100 to output an electric signal as a reproduction signal.

The motor 102 rotates the optical disc medium 100 at a specified rotation rate.

From the electric signal, the analog signal processing section 104 extracts a wobble signal in accordance with the wobbling of the track, a data signal in accordance with the data recorded on the track, and a servo error signal in accordance with the light collection state of the laser light on the track. The analog signal processing section 104 also performs processing for improving the quality of the data signal, and performs amplitude change processing of the data signal using an AGC control signal obtained from the reproduction signal processor 107.

The servo circuit 103 uses a servo error signal to perform a control to optimize the light collection state and the scanning state of the laser light in the optical head section 101. The servo circuit 103 also controls the rotation rate of the motor 102 to be optimal based on the radial position of the optical disc medium 100 to which the laser light is directed or based on the frequency of the wobble signal extracted by the analog signal processing section 104.

The reproduction signal processor 107 receives a wobble signal WBL and a data signal RF from the analog signal processing section 104 and outputs address information and reproduction data to the recording and reproduction timing control section 108.

The reproduction signal processor 107 includes an A/D conversion section 111 for performing analog/digital conversion on a wobble signal, a PLL circuit 102 for generating a clock signal synchronized to the wobble signal, an ADIP reproduction section 113, an A/D conversion section 114 for performing analog/digital conversion on a data signal, an AGC circuit 115, a PLL circuit 116 for generating a clock signal synchronized to the data signal, a PR equalization filter section 117, a viterbi decoding section 118, a data reproduction section 119, and an AUN reproduction circuit 120.

A circuit configuration having a combination of the A/D conversion section 111, the PLL circuit 102 and the ADIP reproduction section 113 acts as a detection section for detecting ADIP address information from the reproduction signal. A circuit configuration having a combination of the A/D conversion section 114, the AGC circuit 115, the PLL circuit 116, the PR equalization filter section 117, the viterbi decoding section 118, the data reproduction section 119 and the AUN reproduction circuit 120 acts as a detection section for detecting AUN address information from the reproduction signal.

The PLL circuit 112 generates a clock signal synchronized to a reproduction signal including ADIP address information. The A/D conversion section 111 samples a wobble signal WBL in synchronization with the clock signal generated by the PLL circuit 112. The ADIP reproduction section 113 detects ADIP information from the reproduction signal. The ADIP reproduction section 113 detects a wobble modulation mark by the MSK modulation system from a digital wobble signal obtained by sampling and reproduces address information.

The PLL circuit 116 generates a clock signal synchronized to a reproduction signal including AUN address information. The clock signal generated by the PLL circuit 116 is used for reproducing user data or other data. The A/D conversion section 114 samples a data signal RF in synchronization with the clock signal generated by the PLL circuit 116, and the sampled data signal is input to the PR equalization filter section 117.

Figure 2:
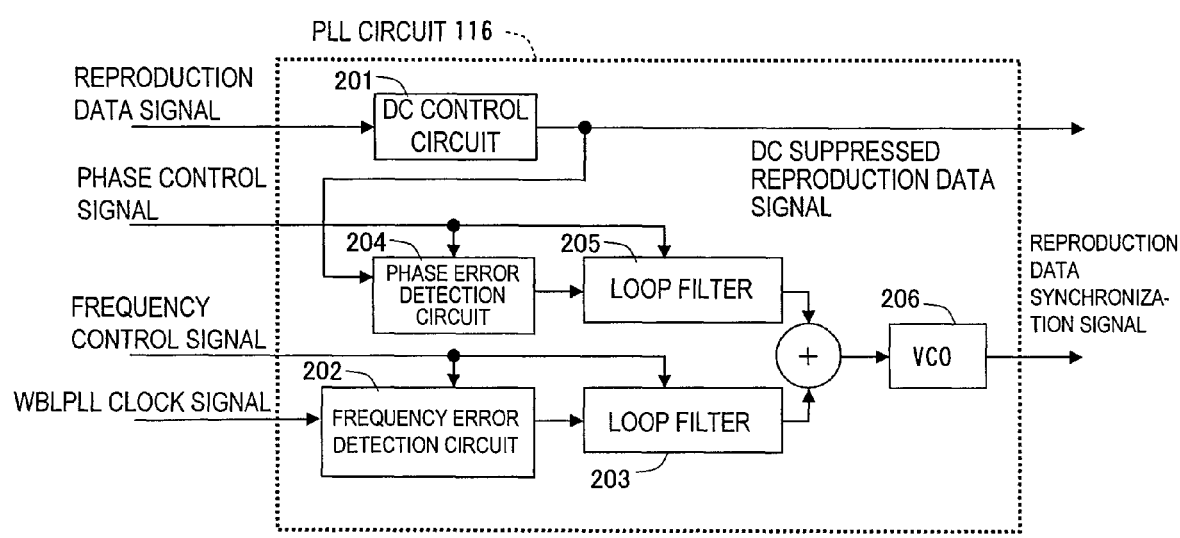
FIG. 2 shows a PLL circuit according to an embodiment of the present invention.

FIG. 2 shows the PLL circuit 116. The PLL circuit 116 includes a DC control circuit 201, a frequency error detection circuit 202, a frequency control loop filter 203, a phase error detection circuit 204, a phase control loop filter 205, and a VCO circuit 206.

The DC control circuit 201 removes a DC component of the data signal sampled by the A/D conversion section 114.

The frequency error detection circuit 202 detects a frequency error from the data signal from which the DC component has been removed.

The frequency control loop filter 203 performs smoothing processing of, for example, accumulating frequency errors and dividing the result by a prescribed value, to perform voltage conversion of the frequency error.

The frequency error detection circuit 202 and the frequency control loop filter 203 perform a hold control, a reset control or a gain change control in accordance with a frequency control signal supplied from the recording and reproduction timing control section 108.

The phase error detection circuit 204 detects a phase error from the data signal from which the DC component has been removed.

The phase control loop filter 205 performs smoothing processing of, for example, accumulating phase errors and dividing the result by a prescribed value, to perform voltage conversion of the phase error.

Figure 3:
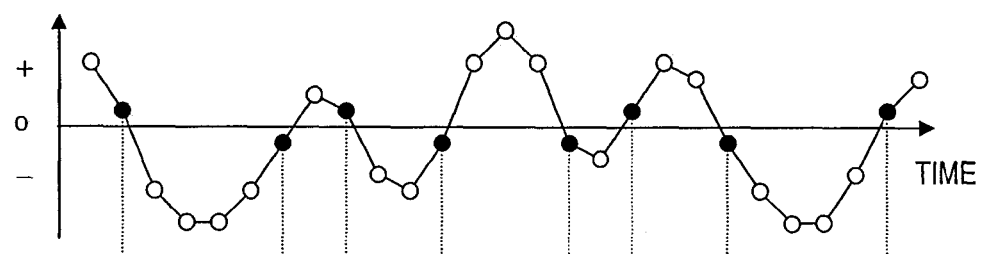
FIG. 3 shows a detection operation of a data phase error according to an embodiment of the present invention.
Figure 3:
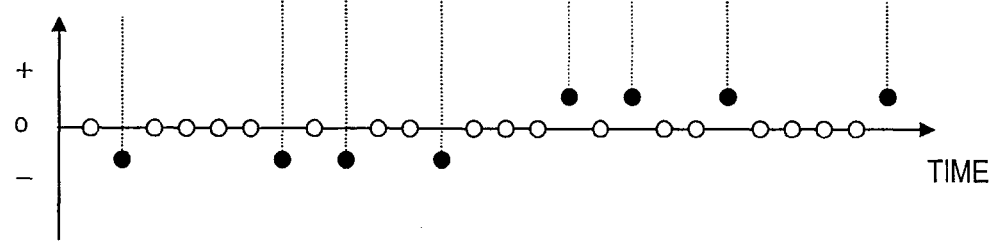

FIG. 3 shows an example of phase error detection. In FIG. 3(a), the white circles (○) and the black circles (●) represent a sampling data signal from which the DC component has been removed. The vertical axis represents the data signal amplitude, and the horizontal axis represents the time axis. "0" of the vertical axis is the reference DC level. Among each 2 adjacent sampling data signals having the reference DC level therebetween, the sampling data signal which is closer to the reference DC level is the zero-cross point. Each zero-cross point is represented with a black circle (●). The amplitude information of the zero-cross point is used as delay/advance information. FIG. 3(b) shows a phase error value at each sample time. Except for the zero-cross points, the sampling data signals are output with the phase error being "0".

Figure 4:
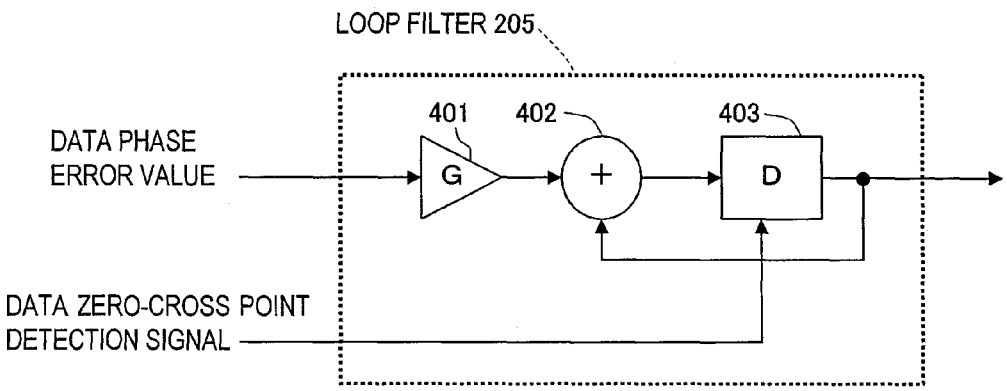
FIG. 4 shows a loop filter of the PLL circuit according to an embodiment of the present invention.

FIG. 4 shows the phase control loop filter 205. The loop filter 205 includes a gain variable circuit 401, an addition circuit 402, and a flip-flop circuit 403. Data phase error values are changed to values which are a prescribed times larger by the gain variable circuit 401 and added together in synchronization with a zero-cross point detection signal. The addition result is divided by a prescribed value and thus output.

The phase error detection circuit 204 and the phase control loop filter 205 perform a hold control, a reset control or a gain change control in accordance with a phase control signal supplied from the recording and reproduction timing control section 108.

The VCO circuit 206 converts a voltage, obtained by adding a voltage value output from the frequency control loop filter 203 and a voltage value output from the phase control loop filter 205 into a frequency and outputs the resultant frequency.

The AGC circuit 115 (FIG. 1) feeds amplitude error information back to the analog signal processing section 104 and performs a control such that the amplitude of the data signal to be input to the A/D converter 114 is kept constant.

The PR equalization filter section 117 performs a desirable partial response on a digital data signal synchronized to the clock signal generated by the PLL circuit 116 using a coefficient obtained by equalization coefficient optimization processing by the adaptive equalization algorithm.

The viterbi decoding section 118 performs likelihood decoding in accordance with the type of the partial response performed by the PR equalization filter section 117 and outputs a data binary signal.

The data reproduction section 119 demodulates the data binary signal in accordance with a prescribed modulation system at a timing specified by the recording and reproduction timing control section 108 and outputs reproduction user data. The AUN address information is inserted to the user data and recorded on the recording medium 100 together with the user data. The AUN reproduction section 120 detects AUN address information from the reproduction signal. The AUN reproduction section 120 receives the data binary signal demodulated by the data reproduction section 119, reproduces the AUN address information included in the data, and outputs the AUN address information to the recording and reproduction timing control section 108.

The recording and reproduction timing control section 108 generates various types of gate signals involved in recording and reproduction control, based on the address information reproduced by the ADIP reproduction section 113, the address information reproduced by the data reproduction section 119 and the AUN reproduction section 120 and the data detection information. Thus, the recording and reproduction timing control section 108 controls the timing for recording data on the optical disc medium 100 and the timing for reproducing data from the optical disc medium 100.

The data modulation section 106 modulates the user data to be recorded on the optical disc medium 100 in accordance with a prescribed modulation system to generate a recording data signal, and outputs the recording data signal at the timing specified by the recording and reproduction timing control section 108.

The power control section 105 controls the power of the laser light in the optical head section 101. For recording, the power control section 105 controls the power of the laser light in accordance with the recording data signal output by the data modulation section 106.

The CPU 110 issues an instruction on a recording operation and a reproduction operation of the optical disc device 10 via the recording and reproduction timing control section 108. The CPU 110 and the recording and reproduction timing control section 108 controls the entire operation of the optical disc device 10.

Figure 6:
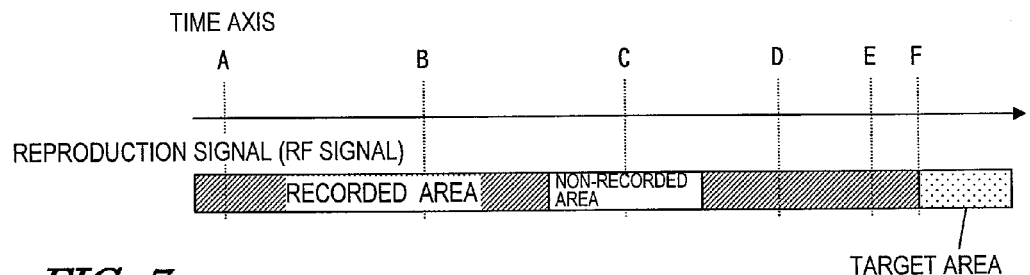
FIG. 6 shows an operation of moving a head position from an inner position to an outer position.

With reference to FIG. 6, an operation of moving the head position from an inner position to an outer position will be described. In FIG. 6, the horizontal axis represents the time axis. FIG. 6 shows a reproduction signal and operation points (A through F). Operation point A is the start point from which the head position is to be moved to an outer position. First, the head position is moved (traverse movement).

At operation point B, ADIP or AUN is once reproduced in order to check the position of the head section. Since operation point B is in a recorded area, AUN address information is first obtained. The traverse moving amount is calculated from the address thereof, and a traverse movement is performed again. Also at operation point C, ADIP or AUN is once reproduced in order to check the position of the head section. Since operation point C is in an unrecorded area, AUN address information cannot be obtained and ADIP address information is detected. The traverse moving amount is calculated from the address thereof, and a traverse movement is performed again. Also at operation point D, ADIP or AUN is once reproduced in order to check the position of the head section. Since operation point D is in a recorded area, AUN address information is first obtained. Since the interval between the obtained address and the target address is equal to or less than a prescribed interval, a multi-jump operation is performed from here instead of a traverse movement. A multi-jump operation is an operation of performing jumps over the track a plurality of times. The number of jumps in the multi-jump operation is calculated based on the address obtained at operation point D. At operation point E, at which a prescribed number of jumps are finished, an address interval to the target is checked again so that a preparation is made for leading address point F of the target address. According to the present invention, the control is performed using address information first detected. By using the AUN address information at operation points B, D and E, the time required until the next action is determined can be reduced to about ⅕ for each time as compared with the case where ADIP address information is used. Therefore, the head can move to the target at high speed.

Obtaining ADIP address information is more time-consuming than obtaining AUN address information. Therefore, when only ADIP address information is used, the movement is significantly slower than when AUN address information is used. Especially in a reproduction operation from an optical disc medium having a large recorded area, the difference in the access speed is conspicuous.

The number of jumps for moving the head section may be changed (namely, the moving distance of each jump of the head section may be changed) between when the access is made based on the ADIP address information and when the access is made based on the AUN address information. AUN address information can be obtained more quickly than ADIP address information. Therefore, the access speed can be further improved by, for example, decreasing the number of jumps when the access is made based on the AUN address information.

In the case where, while the access is being made based on the AUN address information, the address detected in the accessed area is beyond the target address due to an excessive movement of the head section, it is highly possible that the AUN address information was not accurately detected. In this case, it is desirable to switch the address information used for accessing to ADIP address information and makes an access to the target address position again.

In the case where, while the access is being made based on the AUN address information, the AUN address information becomes non-detectable, the access may be switched to the access based on ADIP address information.

For a data recording access, and for a measure access and an unrecorded area detection access described later, either AUN address information or ADIP address information may be used up to the vicinity of the target position. After the head section is moved to a position within a prescribed range from the target position, it is desirable to make the access based on ADIP address information. By this, even when AUN address information is not normally recorded for some reason, the head section can accurately reach the target position. For example, from point E in FIG. 6, it is desirable to make an access based on ADIP address information.

The position within a prescribed range from the target position mentioned above is, for example, a position from which the header section can reach the target address by moving along the track without jumping over the track. The prescribed range is a distance which is sufficient to detect ADIP address information by the time when the head section reaches the target address. As described above with reference to FIG. 24, detection of ADIP address information requires a PLL pull-in period, an address synchronization period, and an address continuity checking period. Therefore, the distance needs to be set in consideration of these periods.

Based on which of ADIP information and AUN address information is first detected, the reproduction and reproduction timing control section 108 controls the post-detection access to the optical disc medium 100. Regarding the concept of "first detected", it is not absolutely necessary that both address information should be detected. The concept encompasses the case where only one address information is detected although it was intended to detect both address information. The access to the optical disc medium after the address information detection is at least one of a read access, a measure access and an unrecorded area detection access. The access to the optical disc medium after the address information detection is an access to an unrecorded area and a recorded area, or an access to an area having both an unrecorded area and a recorded area in a mixed state. For controlling a measure access or an unrecorded area detection access, the reproduction and reproduction timing control section 108 may occasionally use ADIP address information instead of AUN address information.

According to the present invention, the following access control is performed in order to realize a high-speed and stable access. Both an ADIP address information detection operation and an AUN address information detection operation are constantly performed, and an access control is performed using the address information first read. Depending on whether the address information first read is ADIP address information or AUN address information, a reproduction signal processing control such as an AGC control, a PLL control or the like is changed. For each of a read access, a measure access, an unrecorded area detection access or the like, it is determined whether AUN address information is to be used or not. For each of a read access, a measure access, an unrecorded area detection access or the like, a reproduction signal processing control such as an AGC control, a PLL control or the like is changed.

Now, various access controls executed by the optical disc device 10 will be described in more detail.

Hereinafter, a read access, a measure access, and an unrecorded area detection access will be described with reference to control timing flow charts.

Figure 7:
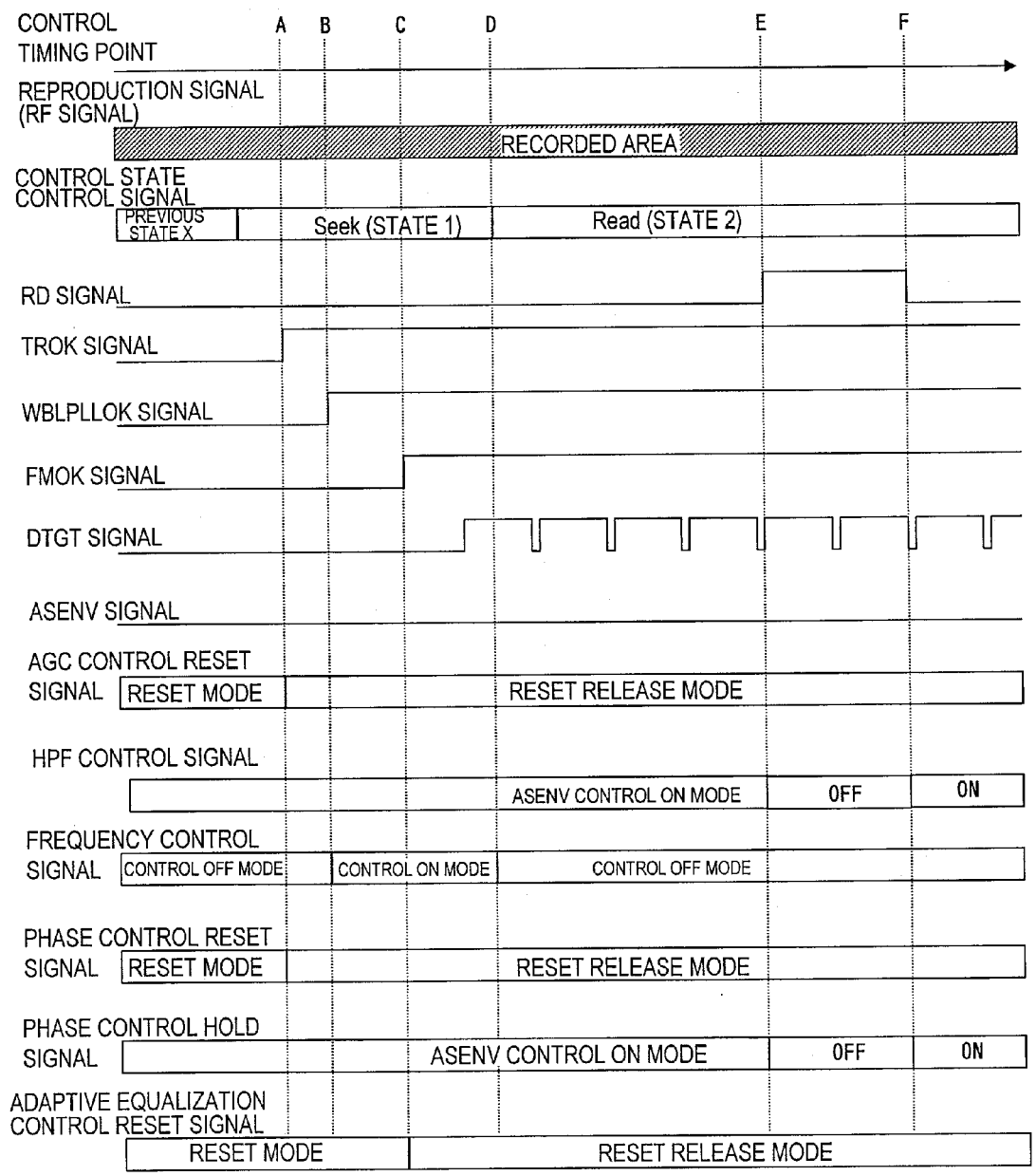
FIG. 7 shows a control timing chart of a read access according to an embodiment of the present invention.

FIG. 7 is a control timing flow chart of a read access.

First, signals shown in the control timing flow chart will be described. These signals are generated by the recording and reproduction timing control section 108 (FIG. 1).

A control timing point indicates the timing point of each control. Each point will be described in detail later.

A reproduction signal indicates whether the accessed area is a recorded area or an unrecorded area.

A control state control signal indicates in which state the access is currently, among a seek access (state 1), a read access (state 2), a read access (state 3), a measure access (state 4) and an unrecorded area detection access (state 5).

An RD signal becomes HIGH at an address position of the target.

A TROK signal becomes HIGH after the tracking pull-in is completed.

A WBLPLLOK signal becomes HIGH after the PLL pull-in is completed, in order to reproduce the address information which is recorded in a winding shape of the track. For example, the pull-in may be regarded as being completed when synchronization information inserted to the address information is detected continuously a prescribed number of times.

An FMOK signal becomes HIGH when a frame synchronization signal inserted to the data signal at each prescribed interval is detected continuously a prescribed number of times, and becomes LOW when such a signal is not detected continuously the prescribed number of times. For example, when the frame synchronization signal is detected 10 times continuously at a prescribed interval from the LOW state, the FMOK signal is transferred to a HIGH state. When the frame synchronization signal is not detected 5 times continuously at a prescribed interval from the HIGH state, the FMOK signal is transferred to a LOW state.

When either address information represented with a winding shape of the track or the address information inserted to the data signal is recognized, a DTGT signal becomes HIGH from a cluster boundary of the recognized address, and then becomes LOW for a prescribed time duration at each cluster boundary. Either the address information represented with a winding shape or the address information inserted to the data signal, which is recognized first, is used as the reference.

An ASENV signal exhibits a HIGH state in a recorded area and exhibits a LOW state in an unrecorded area.

An AGC control reset signal turns OFF an AGC control for controlling an amplitude adjusting gain of a reproduction data signal in the analog signal processing section 104, such that an output signal from the A/D conversion section 114 (FIG. 1) has a prescribed amplitude. When the AGC control is OFF, the set value of the amplitude adjusting gain of the reproduction data signal is fixed to a prescribed value of REFAMP. The REFAMP value may be a value with which the output signal from the A/D conversion section 114 has a prescribed amplitude when an area recorded with an appropriate level of recording power in advance is reproduced. Alternatively, the REFAMP value may be a value given as a design value.

An HPF control signal switches the characteristic of an HPF (high-pass filter) for removing an amplitude fluctuation of the reproduction data signal built in the analog signal processing section 104. For example, the cut-off frequency is set high in a HIGH state and set low in a LOW state. In the example shown in FIG. 7, the cut-off frequency of the HPF characteristic is set low when the ASENV signal and the RD signal are in a HIGH state, and is set high otherwise. This is conducted for the purpose of removing an amplitude fluctuation while the head section is moving from an unrecorded area to a recorded area and for the purpose of keeping the cut-off frequency low during the access to the target area to retain the signal quality.

A frequency control signal performs a control on whether the PLL circuit 116 (FIG. 2) should perform a frequency control (ON) or not (OFF). For example, the ON/OFF of the frequency control can be controlled by turning ON/OFF the output from the frequency error detection circuit 202. This is conducted such that even if a frequency error is erroneously detected by an external disturbance such as a defect or the like in the state where the PLL is in phase synchronization, the operation of the PLL is not influenced.

A phase control reset signal sets the output from the loop filter 205 in the PLL circuit 166 to a prescribed initial voltage value. For example, in a HIGH state, the phase control reset signal sets the output from the loop filter 205 to the prescribed initial voltage value. In a LOW state, the phase control reset signal varies the output voltage in accordance with the error signal from the phase error detection circuit 204 to perform a phase synchronization control.

A phase control hold signal, in a HIGH state, stops the output from the phase error detection circuit 204 to the loop filter 205 in the PLL circuit 116 to stop the phase synchronization control. In a LOW state, the phase control hold signal varies the output voltage in accordance with the error signal from the phase error detection circuit 204 to perform a phase synchronization control.

An adaptive equalization control reset signal, in a HIGH state, stops an adaptive equalization control of the PR equalization circuit 117 (FIG. 1) and sets a prescribed initial value as the equalization coefficient of the filter. In a LOW state, the adaptive equalization control reset signal keeps the adaptive equalization control to be performed to control the adaptive equalization filter section.

FIG. 7 shows a read access to a recorded area. FIG. 7 is a control timing chart in the case where AUN address information is detected before ADIP address information. First, the optical head section is moved from an area to a specific area, and a SEEK operation is performed. The SEEK operation includes a series of control operations such as focusing, tracking pull-in and the like. When the SEEK operation is completed, the TROK signal becomes HIGH at control timing point (A). Then, the wobble signal PLL 112 (FIG. 1) starts a pull-in operation at control timing point (A). At control timing point (B), the PLL pull-in is completed and the WBLPLLOK signal becomes HIGH. Using the WBLPLLOK signal as a trigger, the data signal PLL 116 starts a frequency control operation. Since the data signal PLL 116 performs the frequency control using a clock signal from the wobble signal PLL 112, the operation needs to be started after the wobble signal PLL 112 is locked.

At control timing point (C), the data signal PLL 116 is transferred from the frequency control state to a phase control state and is locked. The FMOK signal becomes HIGH, which indicates that the synchronization signal included in the data signal is detected continuously a prescribed number of times. In synchronization with the FMOK signal, the adaptive equalization control reset signal is released, and the coefficient of the PR equalization filter section 117 starts to be updated. The change of the adaptive equalization control reset signal is not limited to this, and may be set to be released only when the RD signal becomes HIGH.

Control timing point (D) is a point at which the synchronization, and the confirmation of the continuity by the prescribed number of times, of the AUN address information inserted to the data are completed, and each control is started based on the AUN address information. In an access to a recorded area in which data is normally recorded, the AUN address information is detected before the ADIP address information. Therefore, using the AUN address information first detected, an access operation after the address information detection is performed. At this point, the control state control signal is transferred from SEEK (state 1) to READ (state 2). The frequency control of the data signal PLL 116 is put into an OFF state. This is conducted such that even if a frequency error is erroneously detected by an external disturbance such as a defect or the like in the state where the PLL is in phase synchronization, the operation of the PLL is not influenced.

In a zone between control timing points (E) and (F), a target area (=address) is read. In this zone, the HPF control signal and the phase control hold signal which have been mask-controlled by the ASENV signal are released. This is conducted such that even if the ASENV signal becomes non-detected during the reproduction of the target area, the HPF characteristic is not rapidly changed or the PLL control is not put into a hold state. Such processing is not necessary where appropriate means is provided so as to avoid the ASENV signal from becoming non-detected or erroneously detected.

Figure 8:
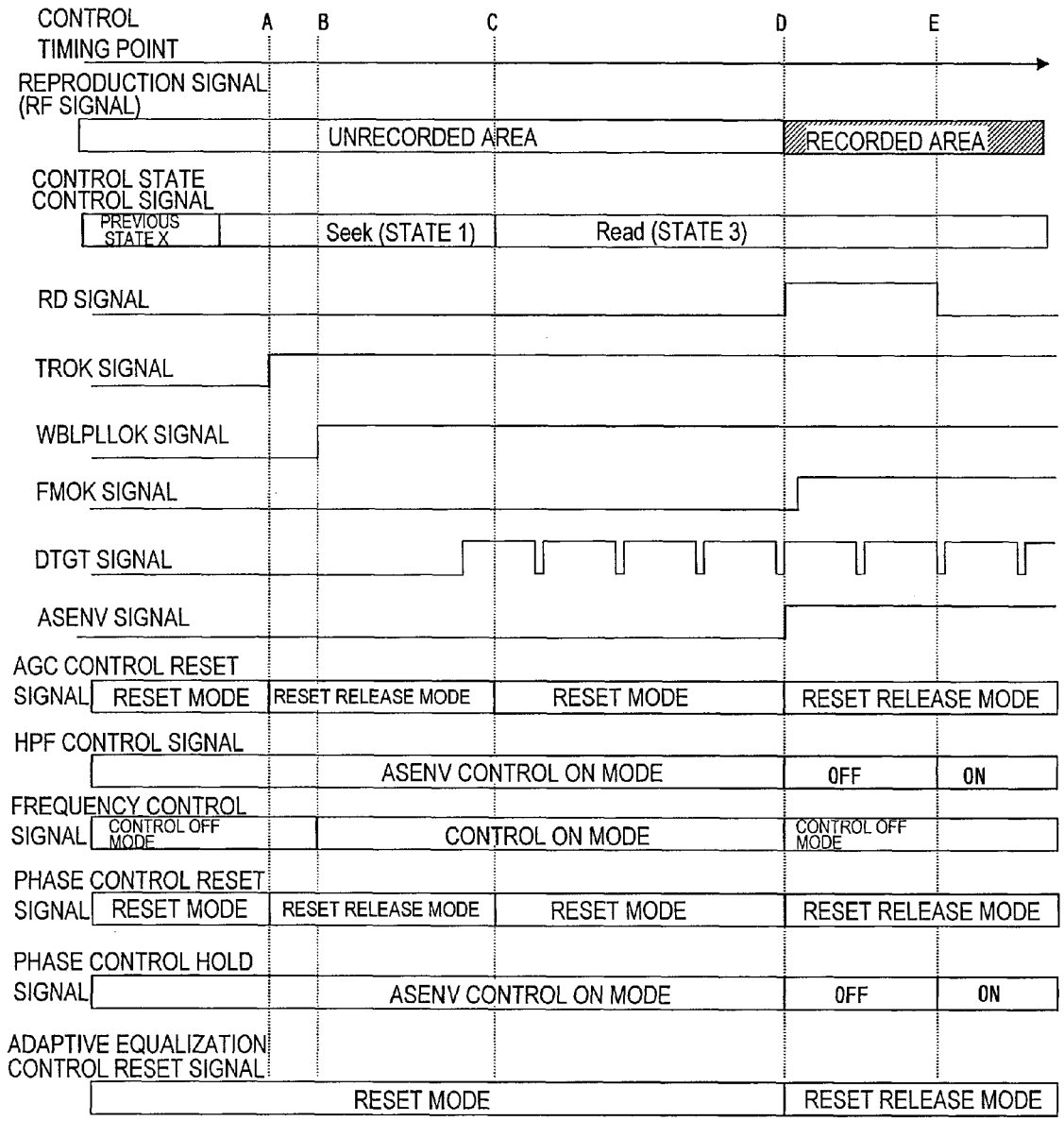
FIG. 8 shows a control timing chart of a read access according to an embodiment of the present invention.

FIG. 8 is a control timing flow chart of a read access to an area having an unrecorded area and a recorded area in a mixed state. First, the optical head section is moved from an area to a specific area, and a SEEK operation is performed. The SEEK operation includes a series of control operations such as focusing, tracking pull-in and the like. When the SEEK operation is completed, the TROK signal becomes HIGH at control timing point (A). Then, the wobble signal PLL 112 (FIG. 1) starts a pull-in operation at control timing point (A). At control timing point (B), the PLL pull-in is completed and the WBLPLLOK signal becomes HIGH. Using the WBLPLLOK signal as a trigger, the data signal PLL 116 starts a frequency control operation. Since the data signal PLL 116 performs the frequency control using a clock signal from the wobble signal PLL 112, the operation needs to be started after the wobble signal PLL 112 is locked.

Control timing point (C) is a point at which the synchronization, and the confirmation of the continuity by the prescribed number of times, of the ADIP address information inserted to the wobble are completed, and each control is started based on the ADIP address information. The AUN address information is not recorded in the unrecorded area. Hence, during an access to the unrecorded area, the AUN address information is not detected and the ADIP address information is detected (necessarily, the ADIP address information is detected before the AUN address information). Therefore, using the detected ADIP address information, an access operation after the address information detection is performed. At this point, the control state control signal is transferred from SEEK (state 1) to READ (state 3). At this point, the AGC control reset signal is transferred to a HIGH state to stop the AGC control, and the phase control reset signal is transferred to a HIGH state to stop the PLL control. The fact that the AUN address information was not first obtained indicates that there is a high possibility that an area immediately before the read target area is an unrecorded area. For this reason, the AGC operation and the PLL operation are stopped to keep an initial state. This is conducted for the following reason. If the AGC is operated in an unrecorded area, the AGC sets an extra gain. As a result, when the head section moves to the target area, which is an appropriate recording area, it requires a long time to obtain an appropriate gain. This brings about adverse effects such that, for example, the target area cannot be stably reproduced. This is also true with the PLL. If the PLL is operated in an unrecorded area, an inaccurate phase error is detected and thus the VCO frequency is made distant from the frequency of the recorded data. As a result, when the head section moves to the target area, which is an appropriate recording area, it requires a long time to put the PLL into a frequency phase locked state. This brings about adverse effects such that, for example, the target area cannot be stably reproduced.

In a zone between control timing points (D) and (E), a target area (=address) is read. In this zone, the AGC reset signal, the PLL reset signal and the adaptive equalization reset signal are released and operated. The HPF control signal and the phase control hold signal which have been mask-controlled by the ASENV signal are released. This is conducted such that even if the ASENV signal becomes non-detected during the reproduction of the target area, the HPF characteristic is not rapidly changed or the PLL control is not put into a hold state. Such processing is not necessary where appropriate means is provided so as to avoid the ASENV signal from becoming non-detected or erroneously detected.

In the above, a read access control to a recorded area and a read access control to an area having an unrecorded area and a recorded in a mixed state have been described with reference to the control access timing flowcharts of FIGS. 7 and 8. Even during an access to an area having an unrecorded area and a recorded in a mixed state, a reproduction signal processing control capable of stably reproducing user data can be provided by actively utilizing the address inserted to the data in order to improve the access speed.

Here, the ASENV signal is a key signal. An optical disc medium is often put to the market without being covered with a cartridge or the like. Therefore, it cannot be avoided that an ASENV signal is erroneously detected or non-detected by the influence of a defect such as a scratch, a fingerprint or the like. Accordingly, the present invention is effective to provide both the improvement of the access speed and the stability.

Figure 9:
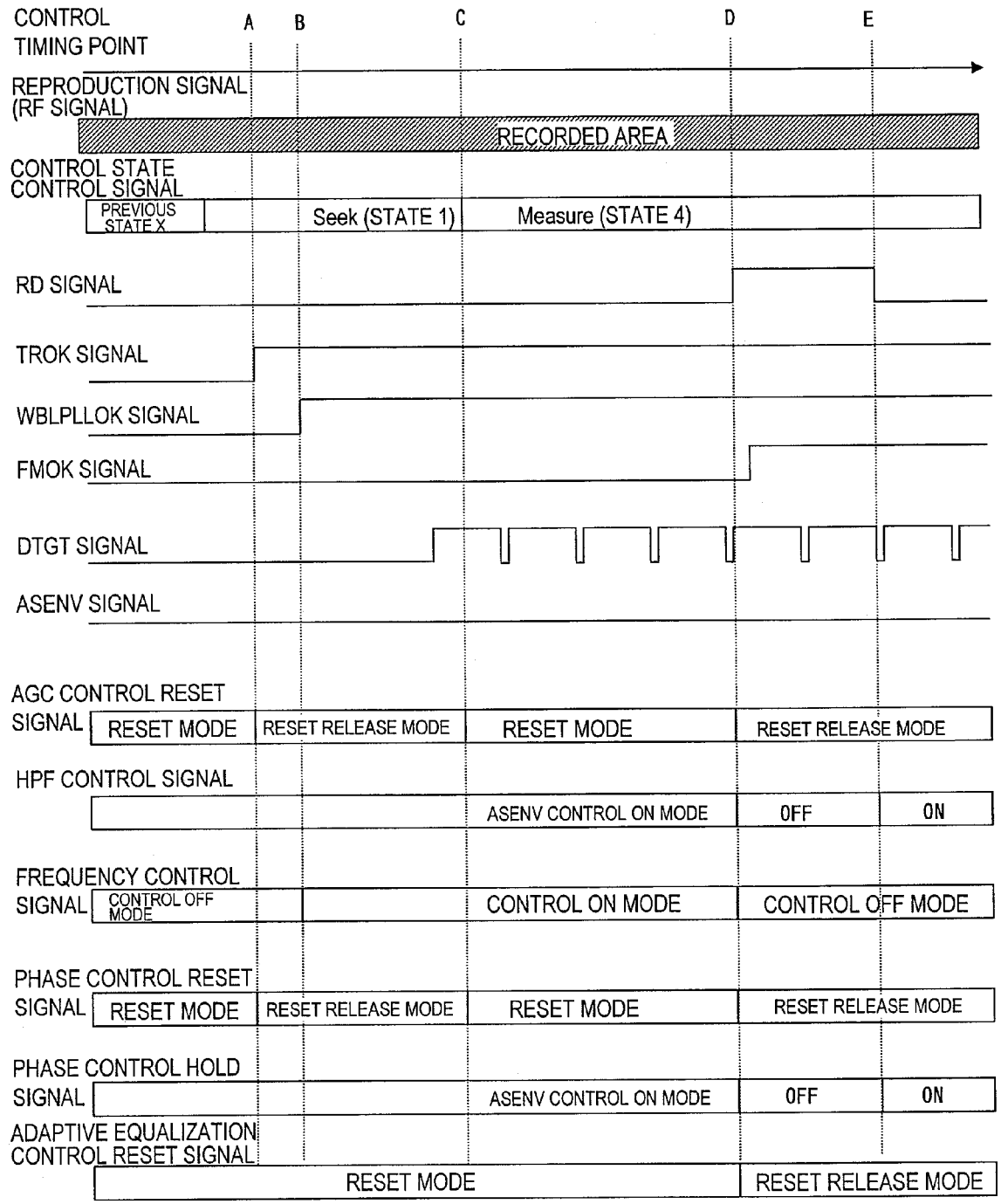
FIG. 9 shows a control timing chart of a measure access according to an embodiment of the present invention.

FIG. 9 is a control timing flow chart of a measure access. A measure access is an access for measuring the recording quality or the state of the data.

Figure 10:
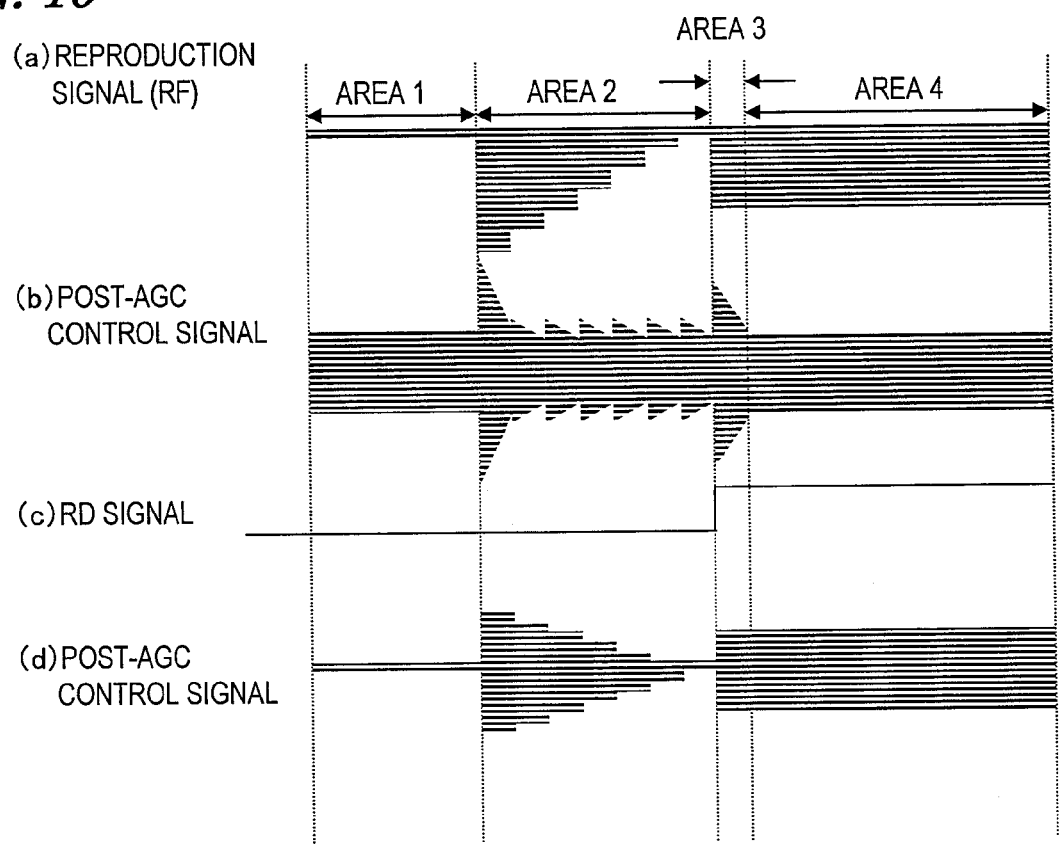
FIG. 10 shows an AGC control operation according to an embodiment of the present invention.

First, problems of the measure access will be described. The measure access is mainly an access to a test recording area, and so the recording quality is not guaranteed. For example, in the case where the recording power is non-uniform, there is an area having an unrecorded area and a recorded area in a mixed state. FIG. 10 shows signals obtained during an access to an unrecorded area, an area in which the recording power has been changed, and an area in which data was recorded with an appropriate level of recording power. Area 1 is an unrecorded area, area 2 is an area in which data was recorded while the recording power was changed from a high level to a low level, and areas 3 and 4 are areas in which data was recorded with an appropriate level of recording power. FIG. 10(*a*) shows a reproduction signal corresponding to each area in a DC form. In this example, an optical disc medium having a reflectance, which is high in the unrecorded area and decreases as the recording power increases, is used.

FIG. 10(*b*) shows an AGC control output waveform in the case where the reproduction signal is AC-coupled and the AGC control is kept performed. When the AGC control is kept performed, the gain is rapidly changed at points at which the waveform represented in a DC form greatly changes. After the AGC control, it requires a long time to control the waveform to have a prescribed value of amplitude, like immediately after the head section is moved from area 1 to area 2. For accessing area 3 et seq., it requires a long time to control the AGC to have an appropriate level of amplitude in area 3. Therefore, an appropriate access to area 3 occasionally may not be realized. There are problems that, for example, the PLL pull-in fails or an appropriate measurement of the amplitude cannot be done in the measure access. By contrast, when the AGC is controlled by an RD signal which becomes HIGH state only in an area which is intended to be accessed as shown in FIG. 10(*c*), there is no elements, caused by a rapid amplitude change, for making the access instable even in area 3 as represented with the AGC control output waveform shown in FIG. 10(*d*). However, when the AGC control is controlled by the RD signal to be constantly ON only in an area to be accessed and constantly OFF in the other areas, the capability of reproducing the address in the data in the areas other than the access target area is decreased like during the read access shown in FIG. 7. It is also possible to perform the AGC control by an ASENV signal. However, it is difficult to provide an appropriate control because the reliability of the ASENV signal is low in an area where data was recorded while the recording power was changed and thus the recording quality (reflectance) is non-uniform as in the example of FIG. 10.

As shown in FIG. 9, in the measure access, like the read access, the optical head section is moved from an area to a specific area, and a SEEK operation is performed. The SEEK operation includes a series of control operations such as focusing, tracking pull-in and the like. When the SEEK operation is completed, the TROK signal becomes HIGH at control timing point (A). Then, the wobble signal PLL 112 (FIG. 1) starts a pull-in operation at control timing point (A). At control timing point (B), the PLL pull-in is completed and the WBLPLLOK signal becomes HIGH. Using the WBLPLLOK signal as a trigger, the data signal PLL 116 starts a frequency control operation. Since the data signal PLL 116 performs the frequency control using a clock signal from the wobble signal PLL 112, the operation needs to be started after the wobble signal PLL 112 is locked.

Control timing point (C) is a point at which the synchronization, and the confirmation of the continuity by the prescribed number of times, of the ADIP address information inserted to the wobble are completed, and each control is started based on the ADIP address information. The measure access is premised to be an access to an area in which data is recorded in a special recording pattern with no AUN address information being inserted. Therefore, the AUN address information is not obtained and an access is made based on the ADIP address information (the access operation in this case is substantially the same as the access operation when the ADIP address information is detected before the AUN address information). Needless to say, the measure access to the user data area may be made based on the AUN address information. In this case, the access operation after the address information detection is performed using either the ADIP address information or the AUN address information which is first detected.

Among different types of measure accesses, more specifically, between an access to a test recording area in which the recording quality is not guaranteed (OPC area) as described above and an access to the user area, the control method may be changed. The example of FIG. 9 is a measure access to the OPC area. At point (C), the control state control signal is transferred to SEEK (state 1) to MEASURE (state 4). At this point, the AGC control reset signal is transferred to a HIGH state to stop the AGC control, and the phase control reset signal is transferred to a HIGH state to stop the PLL control.

In a zone between control timing points (D) and (E), a target area (=address) is measured. In this zone, the AGC reset signal, the PLL reset signal and the adaptive equalization reset signal are released and operated. The HPF control signal and the phase control hold signal which have been mask-controlled by the ASENV signal are released. This is conducted such that even if the ASENV signal becomes non-detected during the reproduction of the target area, the HPF characteristic is not rapidly changed or the PLL control is not put into a hold state. Such processing is not necessary where appropriate means is provided so as to avoid the ASENV signal from becoming non-detected or erroneously detected. Changing the control method of the reproduction signal processing for each purpose of the access or for each area to be accessed is effective to stabilize the system.

Figure 11:
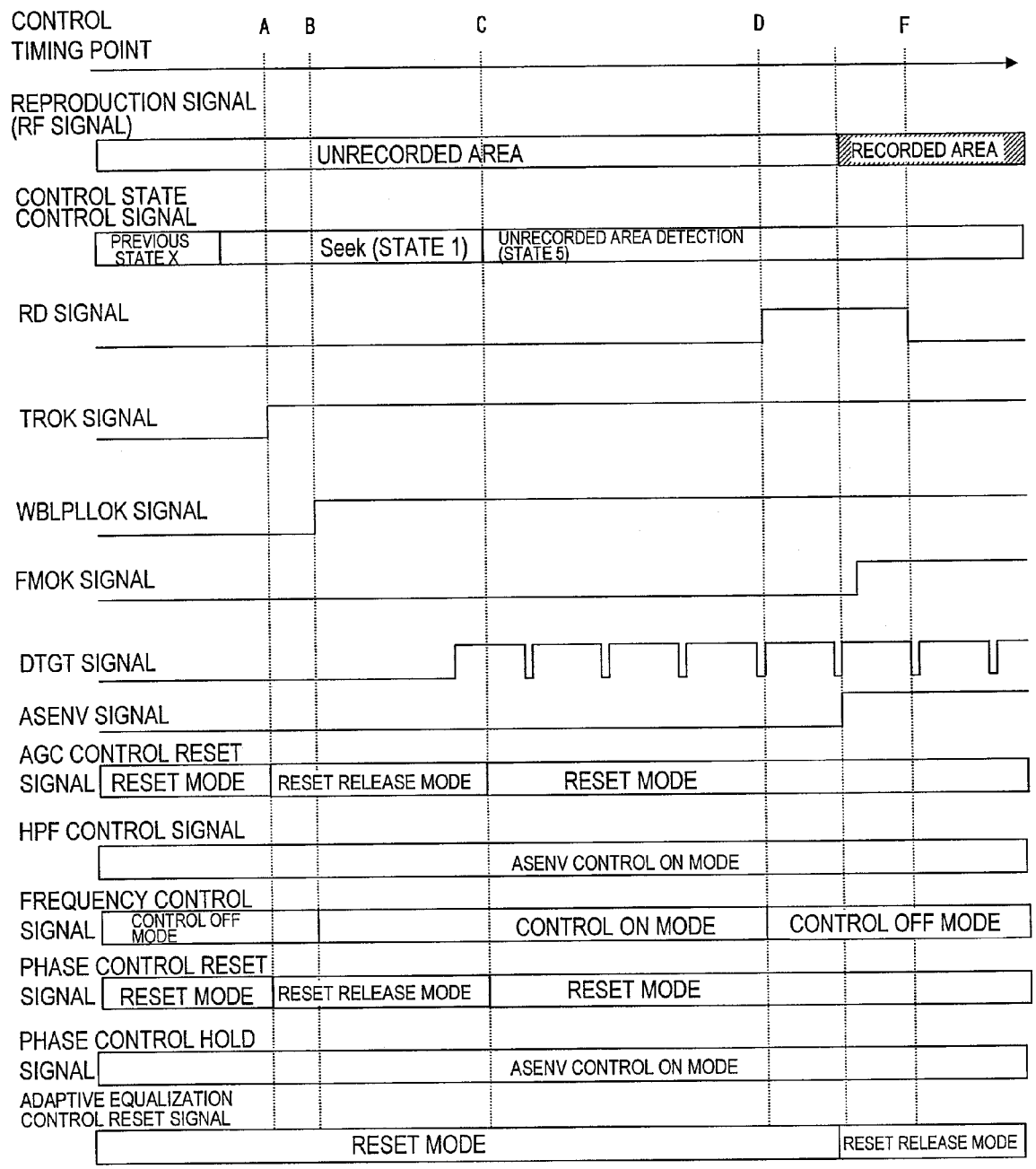
FIG. 11 shows a control timing chart of an unrecorded area detection access according to an embodiment of the present invention.

FIG. 11 is a control timing flow chart of an unrecorded area detection access. An unrecorded area detection access is an access for detecting a recording continuing portion (address) for additionally recording of data. The unrecorded area detection access is mainly made to a user data but may also be made to a test recording area. For example, in the unrecorded area detection access, an access is made to an area regardless of whether the area is an unrecorded area or a recorded area, and it is determined whether the accessed area is an unrecorded area or a recorded area using a synchronization signal of an AUN address information unit or a frame unit having higher precision than the AUN address information included in the user data. In order to make such a determination, an AGC control and a PLL control need to be performed stably. For example, an ASENV signal is used as a control signal. However, there may occasionally be an area which cannot be determined as an unrecorded area or a recorded area for various reasons. In such a case, the ASENV signal is regarded as non-detected or erroneously detected, and thus the ASENV control becomes unstable. Therefore, processing is made of, for example, not performing the AGC control, which is significantly influenced by the state where the ASENV signal is non-detected or erroneously detected. This is conducted with the premise that a signal having a nearly appropriate level of amplitude is input to the A/D conversion circuit 114 (FIG. 1).

In the unrecorded area detection access, like the other accesses described above, the optical head section is moved from an area to a specific area, and a SEEK operation is performed. The SEEK operation includes a series of control operations such as focusing, tracking pull-in and the like. When the SEEK operation is completed, the TROK signal becomes HIGH at control timing point (A). Then, the wobble signal PLL 112 (FIG. 1) starts a pull-in operation at control timing point (A). At control timing point (B), the PLL pull-in is completed and the WBLPLLOK signal becomes HIGH. Using the WBLPLLOK signal as a trigger, the data signal PLL 116 starts a frequency control operation. Since the data signal PLL 116 performs the frequency control using a clock signal from the wobble signal PLL 112, the operation needs to be started after the wobble signal PLL 112 is locked.

Control timing point (C) is a point at which the synchronization, and the confirmation of the continuity by the prescribed number of times, of the ADIP address information inserted to the wobble are completed, and each control is started based on the ADIP address information. The unrecorded area detection access is premised to be an access to an area having an unrecorded area and a recorded area in a mixed state. Therefore, the AUN address information is not obtained and an access is made based on the ADIP address information (the access operation in this case is substantially the same as the access operation when the ADIP address information is detected before the AUN address information). FIG. 11 shows an unrecorded area detection access from an unrecorded area to a recorded area of the data area. At point (C), the control state control signal is transferred from SEEK (state 1) to unrecorded area detection (state 5). At this point, the AGC control reset signal is transferred to a HIGH state to stop the AGC control, and the phase control reset signal is transferred to a HIGH state to stop the PLL control.

A zone between control timing points (D) and (F) is a target area (=address). A zone between control timing points (D) and (E) is an unrecorded area, and a zone between control timing points (E) and (F) is a recorded area. In this zone, the PLL reset signal and the adaptive equalization reset signal are released and operated. The HPF control signal which has been mask-controlled by the ASENV signal is released. The AGC control is kept in a reset state, and the PLL hold control is performed by the ASENV signal.

In the above, the operation flows of a read access, a measure access, and an unrecorded area detection access have been described with reference to the timing flowcharts. Changing the control method of the reproduction signal processing for each purpose of the access or for each area to be accessed is effective to stabilize the system.

Embodiment 2

Figure 12:
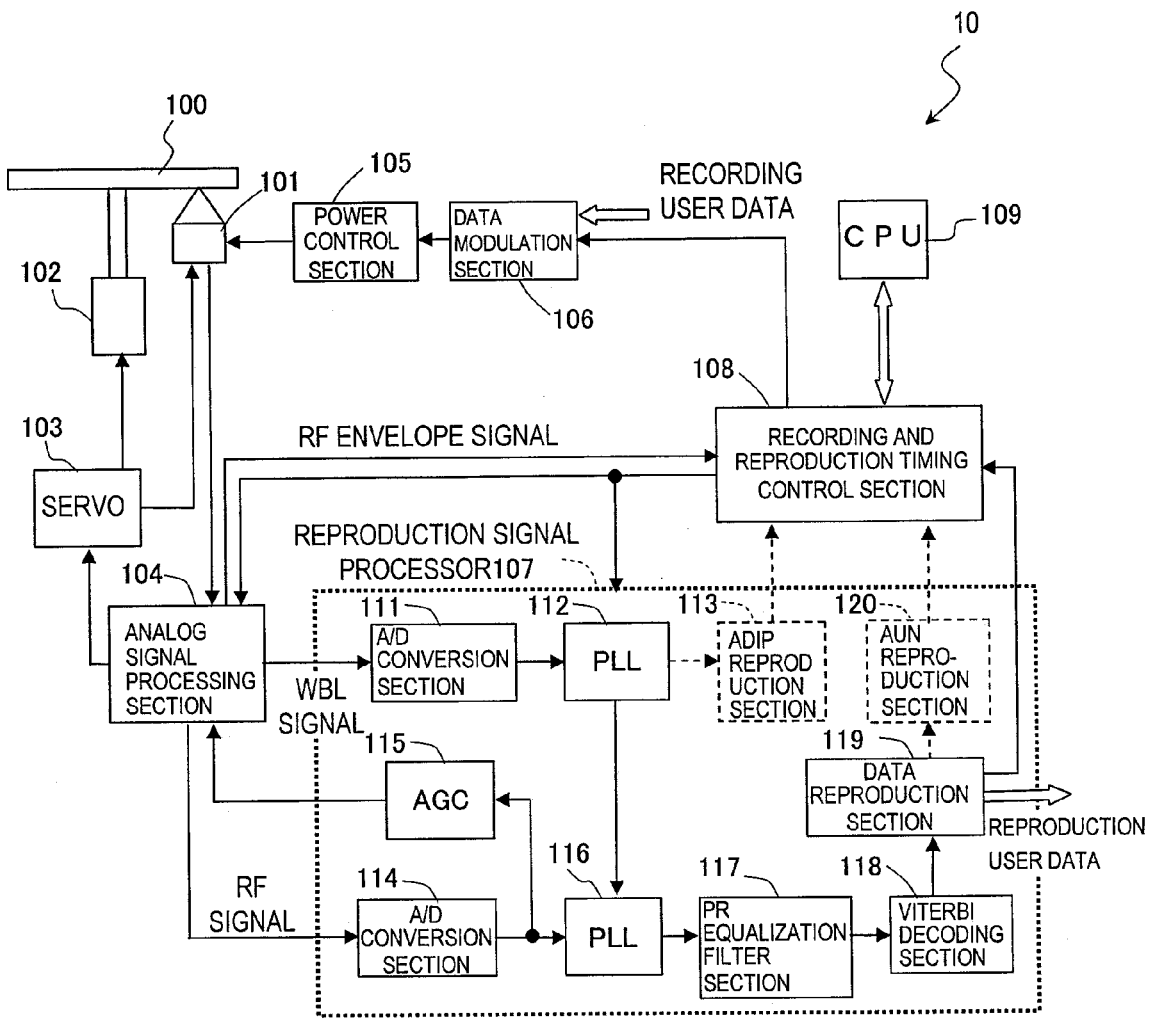
FIG. 12 shows an optical disc device according to an embodiment of the present invention.

Next, with reference to FIG. 12, an optical disc device 10 capable of stably accessing (reproduction, measure, etc.) an area having a recorded area and an unrecorded area in a mixed state will be described. FIG. 12 is a block diagram showing the optical disc device 10 according to this embodiment.

The optical disc device 10 shown in FIG. 12 includes an optical head section 101, a motor 102, a servo circuit 103, an analog signal processing section 104, a power control section 105, a data modulation section 106, a reproduction signal processor 107, a recording and reproduction timing control section 108, and a CPU 109.

In this embodiment, a stable access is realized by controlling the PLL 116 as follows. The PLL 116 switches the synchronization target thereof between a reproduction signal (RF signal) and a WBLPLL clock signal using a prescribed signal, and thus can realize a stable access. The prescribed signal may be an ASENV signal generated from an RF envelope signal included in the reproduction signal, or a synchronization detection state signal or an address detection state signal which can be detected during data reproduction. The ASENV signal is generated by comparing the level of the RF envelope signal with a prescribed threshold level. For example, when the level of the RF envelope signal is higher than the threshold level, the ASENV signal becomes HIGH; whereas when the level of the RF envelope signal is lower than the threshold level, the ASENV signal becomes LOW. Based on the envelope signal, the recording and reproduction timing control section 108 determines whether the access target area is an unrecorded area or a recorded area. The recording and reproduction timing control section 108 switches the synchronization target of the PLL 116 between the reproduction signal and the WBLPLL clock signal in accordance with, for example, a reproduction state of the data recorded on the recording medium. Hereinafter, the access operation will be described in more detail.

Figure 13:
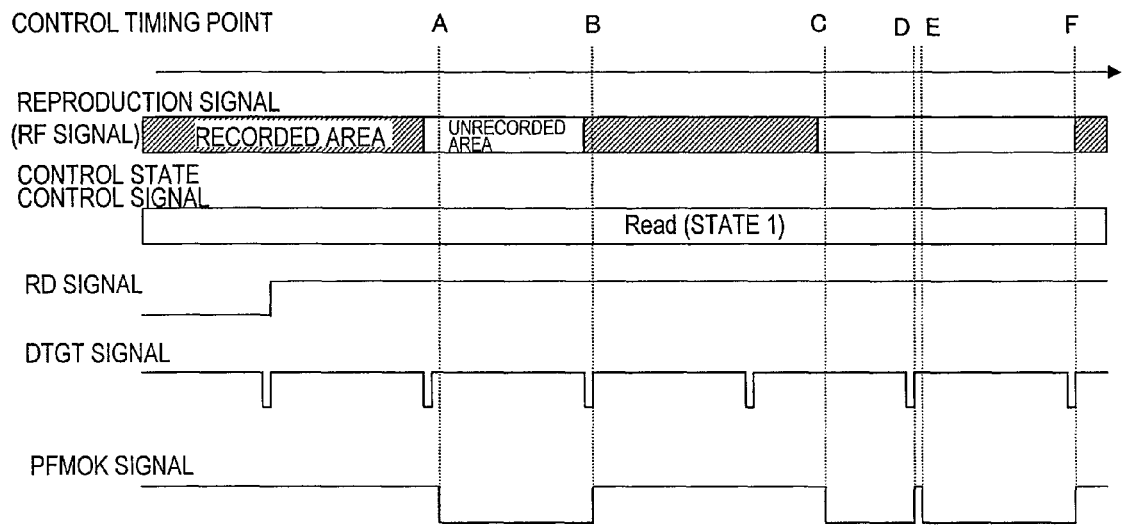
FIG. 13(a) is a timing chart showing a control operation of a PFMOK signal according to an embodiment of the present invention.
FIG. 13(b) is a timing chart showing a control operation of an ASENVDT signal according to an embodiment of the present invention.
Figure 13:
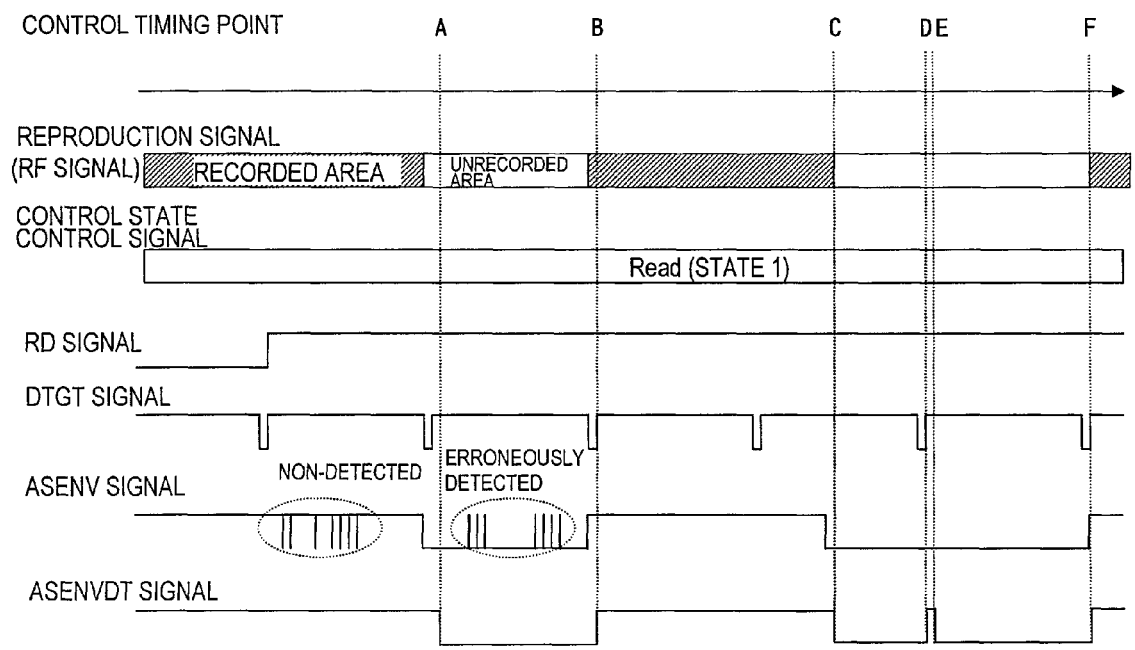

Now, the read access described above with reference to FIG. 7 will be further described with reference to FIG. 13. FIG. 13(a) shows an exemplary access in the case where an access control is performed based on the AUN address information in a user area having data recorded therein and the user area has an unrecorded area in the recorded area. The RD signal and the DTGT signal are as described above. The recording and reproduction timing control section 108 newly generates a PFMOK signal. The PFMOK signal becomes HIGH at a rise of the DTGT signal or when a synchronization signal in the data is detected continuously a prescribed number of times, and becomes LOW when synchronization signal in the data is not detected continuously the prescribed number of times. A stable access can be realized by resetting or holding the AGC and the PLL when the PFMOK signal is in a LOW state. It should be noted that the PFMOK signal is usable only in an access to a recorded area in which a synchronization signal in inserted in the recorded data. The PFMOK signal is usable as a part of a read access or an unrecorded area detection access. The PFMOK signal has a feature of once, without fail, releasing the reset or hold control at the start of each RUB. By this control, the influence on the reproduction signal processing control for the next RUB can be prevented. The FMOK signal is not put into a HIGH state unless a synchronization signal is detected continuously a prescribed number of times, and therefore the influence on the next RUB cannot be prevented. By using a PFMOK signal instead of an ASENV signal in this manner, a stable access can be realized.

As another example, the read access described above with reference to FIG. 7 will be further described with reference to FIG. 13(b). FIG. 13(b) shows an exemplary access in the case where an access control is performed based on the AUN address information in a user area having data recorded therein and the user area has an unrecorded area in the recorded area. The RD signal, the DTGT signal and the ASENV signal are as described above. In this example, the ASENV signal is non-detected in the recorded area and erroneously detected in the unrecorded area. In order to eliminate the influence of the non-detection and erroneous detection of the ASENV signal and prevent an influence on the access to the next area, the recording and reproduction timing control section 108 newly generates an ASENVDT signal. The ASENVDT signal samples and accumulates the ASENV signal in a prescribed zone and compares the accumulated value with a prescribed threshold value to determine whether the accessed area is an unrecorded area or a recorded area. Namely, the ASENVDT signal makes a determination on the ASENV signal by majority rule. In order to avoid an influence on the next access area, the ASENVDT signal is in a HIGH state, without fail, at a rise of the DTGT signal which indicates a start position of the data unit. This is conducted in order to avoid the situation where by making the determination after the head section passes a prescribed zone, the accessed area is determined as an unrecorded area even if there is a recorded area at the start of the accessed area. Even when the accessed area is an unrecorded area, the determination that the area is an unrecorded area is finally made as a result of making a determination by majority rule on a prescribed zone continuously a prescribed number of times, and the ASENVDT signal is put into a LOW state. Therefore, the next access is not influenced.

When a prescribed zone is determined as an unrecorded area continuously a prescribed number of times, the ASENVDT signal becomes LOW. When a prescribed zone is determined as a recorded area continuously the prescribed number of times, the ASENVDT signal becomes HIGH. The prescribed zone may be, for example, a frame unit (e.g., 2000T). The above-mentioned prescribed threshold which is compared with the accumulation result may be, for example, 80% of the maximum value among the values detected in the prescribed zone. The prescribed number of times used for determining whether the area is a recorded area or an unrecorded area may be, for example, 2. There is no specific limitation on these elements. A stable access can be realized by performing a reset or hold control on the AGC and the PLL when the ASENVDT signal is in a LOW state. By using an ASENVDT signal instead of an ASENV signal in this manner, a stable access can be realized. Needless to say, the PFMOK signal described above and the ASENVDT signal may be combined to control the AGC, the PLL and the like.

In addition, these signals (PFMOK signal, ASENVDT signal) and the ASENV signal may be combined to control the AGC, the PLL and the like. An example in which a combination of the ASENV signal and the ASENVDT signal is used for controlling the operation of the PLL will be described. Where the ASENV signal and the ASENVDT signal exhibits a LOW state in an unrecorded area and a HIGH state in a recorded area, the PLL can be controlled by the logic of !ASENV OR !ASENVDT. The ASENV signal involves a possibility of being non-detected or erroneously detected, but is detected at high speed. By contrast, the ASENVDT signal, which is generated by a determination on the ASENV signal by majority rule, has a low possibility of being non-detected or erroneously detected, but is detected at low speed. As described above, as a countermeasure against the detection delay, the ASENVDT signal is once forcibly brought to a HIGH state at the start of the cluster. Then, when the area is determined as an unrecorded area as a result of the determination on the ASENV signal by majority rule, the ASENVDT signal becomes LOW; whereas when the area is determined as a recorded area, the ASENVDT signal is kept in the HIGH state. When !ASENV OR !ASENVDT is in a HIGH state, the PLL is held or synchronized to the WBLPLL clock signal described below. When !ASENV OR !ASENVDT is in a LOW state, the PLL is synchronized to the reproduction signal. By such control, a malfunction of the PLL due to the erroneous detection of the ASENV signal can be avoided in an unrecorded area, and data can be detected at high speed in a recorded area. Hence, the data can be reproduced stably.

Figure 14:
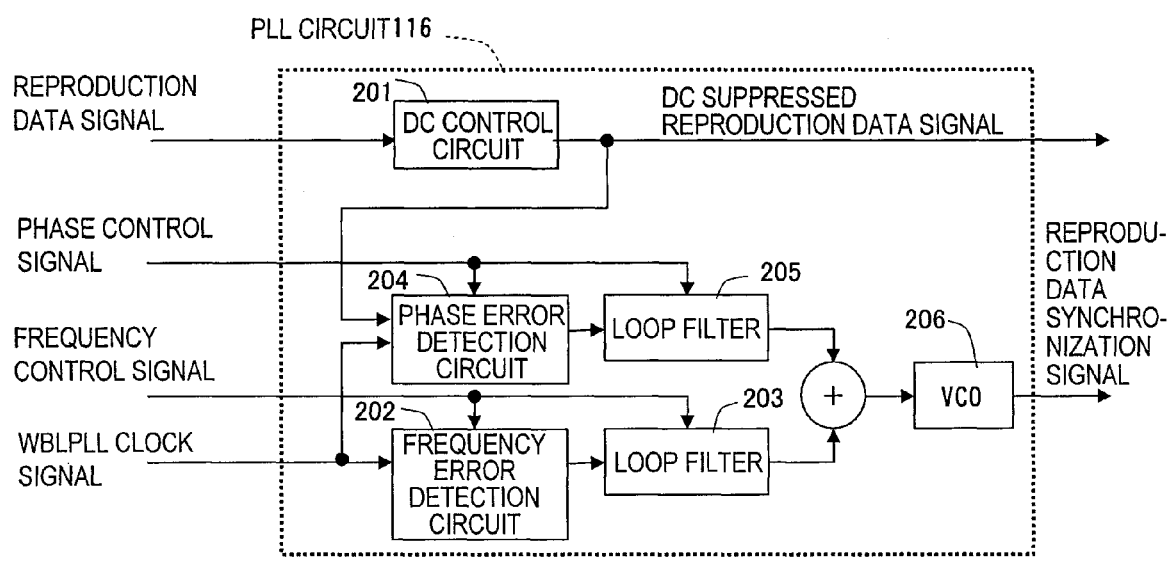
FIG. 14 shows a data PLL circuit according to an embodiment of the present invention.

Now, an example of a different manner of PLL control will be described. In the above example, the PLL is reset, or held based on the ASENV signal or the like, when the area is determined as an unrecorded area or in accordance with the type of access. In the PLL control method described hereinafter, the data signal PLL 116 is put into phase synchronization with a system clock generated by the wobble signal PLL 112 (FIG. 1). FIG. 14 shows a PLL circuit 116. In this PLL circuit 116, unlike in the PLL circuit shown in FIG. 2, a WBLPLL clock is input to the phase error detection circuit 204. In accordance with the access state after the address information detection, the recording and reproduction timing control section 108 (FIG. 1) selects either the reproduction signal or the ADIP clock signal as the signal to which the phase of the clock signal of the PLL circuit 116 is to be synchronized.

When the area is determined as an unrecorded area by the PFMOK signal, the ASENVDT signal or the like, the phase error detection circuit 204 switches the phase error signal to be output, from a phase error signal generated from the output signal from the DC control circuit 201 to a phase error signal generated from the WBLPLL clock signal. The phase error detection circuit 204 also switches the phase error signal to be output, at a prescribed timing in accordance with the access described above. For example, in a measure access, the phase error detection circuit 204 outputs a phase error signal generated from the WBLPLL clock signal until the optical head section reaches the target area, and outputs a phase error signal generated from the output signal from the DC control circuit 201 while the optical head section is in the target area. By such a control, the PLL circuit can be in phase synchronization with an appropriate signal, and thus a system operation for various accesses can always be stabilized. In the case where the WBLPLL clock signal is a recording clock signal, the frequency thereof is substantially the same as the frequency of the data reproduction clock signal. Therefore, there is an advantage that the PLL pull-in can be easily performed in the data recorded area. This control method has a premise of using a format in which a wobble signal in accordance with the wobbling of the track can be generated. The wobble signal can be reproduced stably both in an unrecorded area and a recorded area, and therefore the PLL circuit 116 can constantly obtain the WBLPLL clock signal stably.

In the above example, the phase control of the PLL is stabilized by switching the operation, when necessary, between a mode of synchronizing the PLL to the WBLPLL clock signal and a mode of synchronizing the PLL to the reproduction data. Advantages of the present invention will be described with further specific examples.

Figure 15:
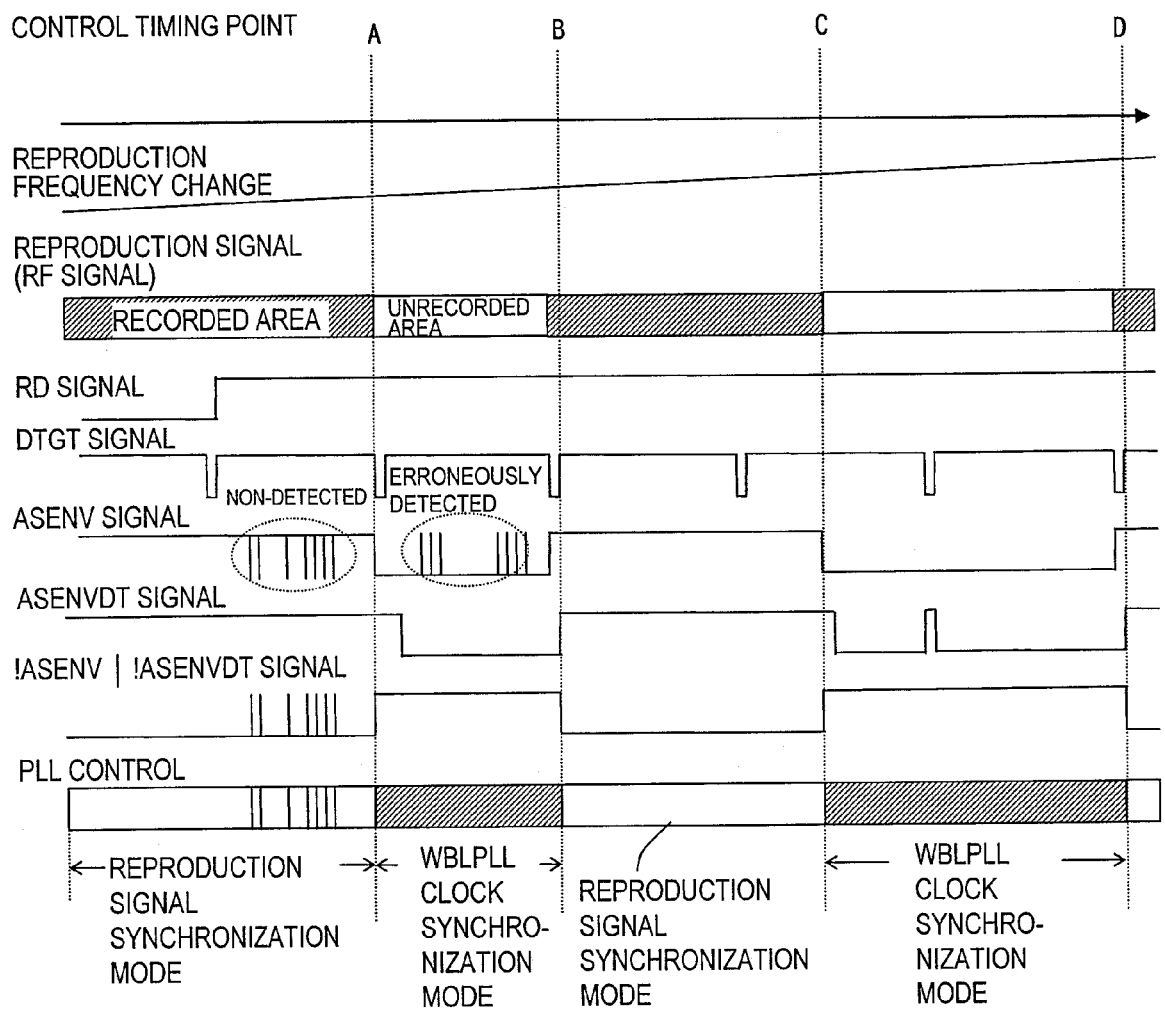
FIG. 15 shows a PLL control in the case where the reproduction frequency is changed, according to an embodiment of the present invention.

With reference to FIG. 15, a PLL control in the case where the frequency of the reproduction signal changes. The frequency of the reproduction signal changes, for example, while the motor rotation is being set under a CLV (Constant Linear Velocity) control or when data recorded under the CLV control is reproduced under a CAV (Constant Angular Velocity) control. As described above, according to the present invention, the PLL control is performed by using, for example, a combination signal of the ASENV signal and the ASENVDT signal. In a zone where the !ASENV OR !ASENVDT signal is in a LOW state, the phase is synchronized to the reproduction signal; whereas in a zone where the !ASENV OR !ASENVDT signal is in a HIGH state, the phase is synchronized to the WBLPLL clock signal. By such a control, the PLL can be constantly synchronized to some signal and thus can maintain a stable state. As a result, even if a reproduction frequency changes at control timing points (B) and (D) in FIG. 15 at which the optical head section moves from an unrecorded area to a recorded area, the PLL pull-in operation can be performed with substantially no frequency error. This provides an effect that the PLL pull-in operation is always stable.

Non-detection of the ASENV signal may occasionally be caused by a defect such as a scratch, a fingerprint or the like. In this case, in a zone where the ASENV signal is in a LOW state, the !ASENV OR !ASENVDT signal becomes LOW, and the operation is switched to the mode of synchronizing the PLL to the WBLPLL clock. In a defect portion, the reproduction signal has an external disturbance, and so it is made difficult to synchronize the PLL to the reproduction signal. As a result, the frequency at which the PLL is locked may be significantly shifted. In such a case, by once switching the operation to the mode of synchronizing the PLL to the WBLPLL clock signal, the frequency at which the PLL is locked can be stably maintained and the re-pull-in can be stably performed after the optical head section passes the defect portion.

Figure 16:
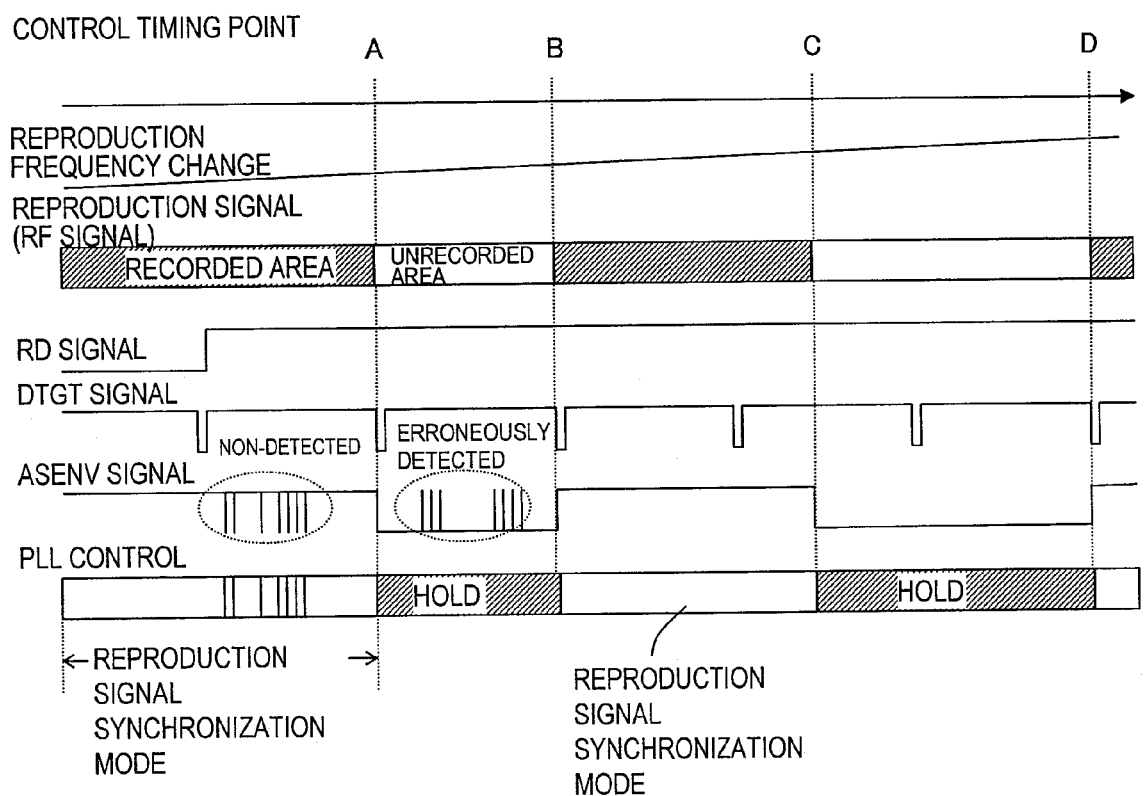
FIG. 16 shows a PLL control of only holding the PLL by an ASENV signal in a situation where the reproduction frequency is changed.

Next, with reference to FIG. 16, a PLL control of only holding the PLL by the ASENV signal in a situation where the reproduction frequency changes. In this method, when an erroneous detection occurs in an unrecorded area, the hold control on the PLL is released although the area is an unrecorded area. As a result, the PLL occasionally may not obtain appropriate phase information and may become unstable. In addition, since the PLL is held in an unrecorded area, the operation cannot follow the frequency change. As a result, the PLL pull-in occasionally may not be stably performed at control timing points (B) and (D) in FIG. 16 at which the optical head section moves from un recorded area to a recorded area.

In a portion where the ASENV signal is non-detected as described above, the PLL is put into a hold state. Thus, an external disturbance to the PLL caused by a defect or the like is prevented, and the re-pull-in can be stably performed after the optical head section passes the defect portion. However, in a situation where the reproduction signal changes as shown in FIG. 16, the hold state of the PLL means temporarily stopping the operation from following the frequency change. This may occasionally make it difficult to perform the PLL re-pull-in.

Figure 17:
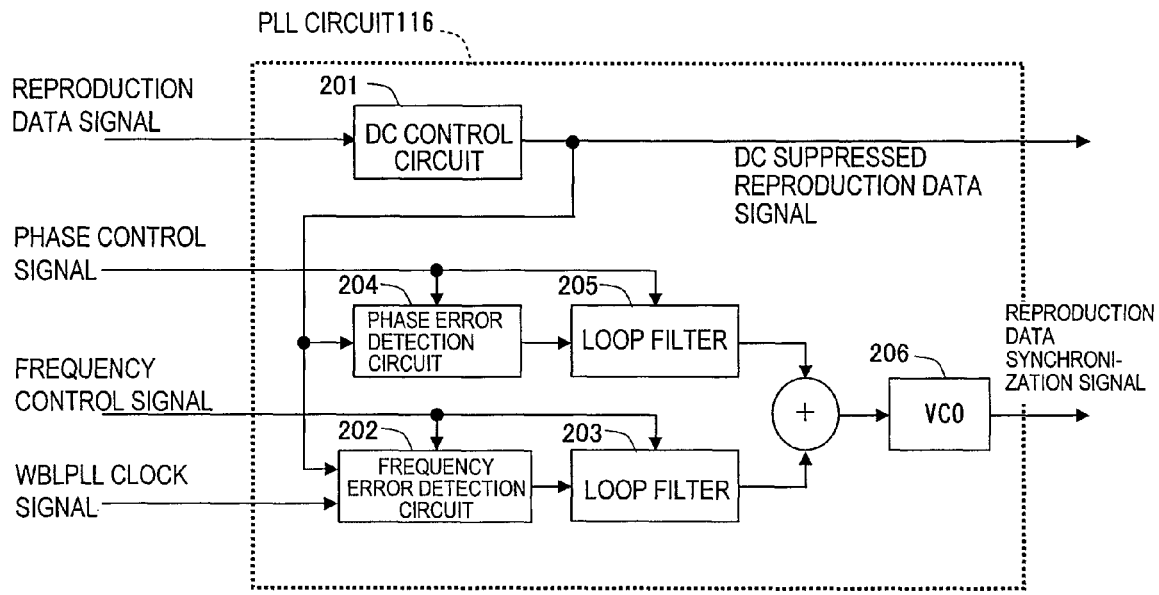
FIG. 17 shows a data PLL circuit according to an embodiment of the present invention.

Here, an example of a different manner of PLL control will be described. In the PLL circuit 116 shown in FIG. 2, both the frequency control and the phase control are performed using the WBLPLL clock signal. In this example, the frequency control using the WBLPLL clock signal and the frequency control using a synchronization signal included in the reproduction signal are switched. FIG. 17 shows a PLL circuit 116. In this PLL circuit 116, unlike in the PLL circuit shown in FIG. 2, an output signal from the DC control circuit 201 is input to the frequency error detection circuit 202. The frequency error detection circuit 202 extracts a synchronization signal included in the reproduction signal. The frequency control is switched by, for example, a frequency control signal. By the control using a synchronization signal included in the reproduction signal, the frequency control and the phase control can be performed without being influenced by the state of the wobble signal PLL 112. Hence, the PLL pull-in can be performed at high speed. This PLL pull-in method is used, for example, for a ROM (Read Only Memory) disc with no wobble signal. This frequency control method is usable in an access to an area with no unrecorded area and in an access to an area where AUN address information can be obtained. Therefore, the CPU 109 (FIG. 1) is aware of the state of the area of the disc to be accessed, and can realize a high-speed access by switching the frequency control. The CPU 109 can find the state of the area to be accessed at the time of self recording/self reproduction or by management information, and so can switch the frequency control.

The recording and reproduction timing control section 108 (FIG. 1) changes the operation of the PLL 116 at, for example, a timing at which one of the ADIP address information and the AUN address information is detected, a timing at which the access target area after the address information detection is reached, or a timing at which it is determined whether the access target area after the address information detection is an unrecorded area or a recorded area. In accordance with whether the accessed position is in the access target area or not, the recording and reproduction timing control section 108 changes the operation of the PLL 116.

For a measure access, when the accessed position is in the access target area, the recording and reproduction timing control section 108 synchronizes the phase of the clock signal generated by the PLL circuit 116 to the reproduction signal. When the accessed position is outside the access target area, the recording and reproduction timing control section 108 synchronizes the phase of the clock signal generated by the PLL circuit 116 to the WBLPLL clock signal.

Figure 24:
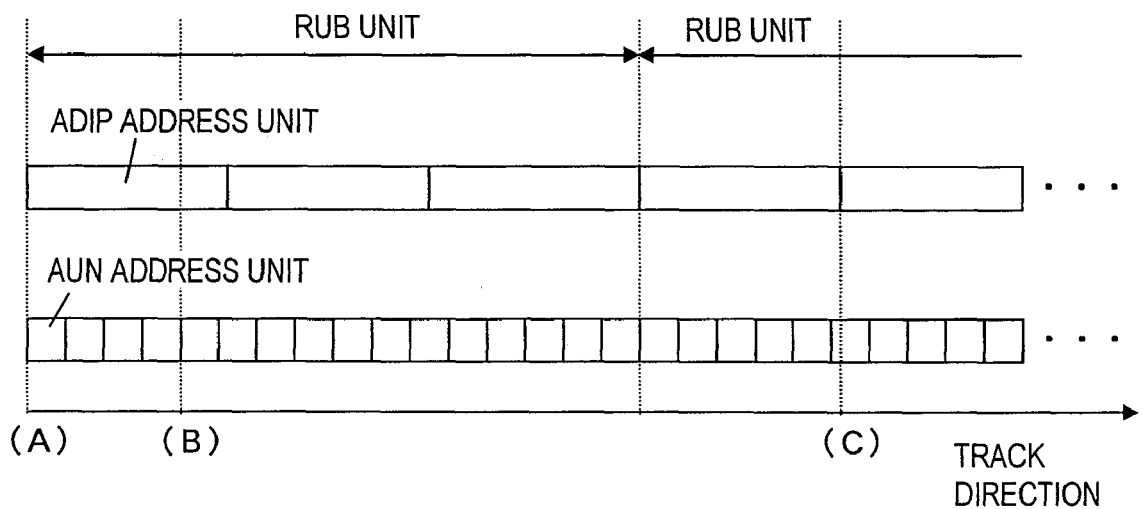
FIGS. 24(a) and (b) compare the detection speeds of ADIP address information and AUN address information.

Here, recovery processing for the control of obtaining both the ADIP address information and the AUN address information and making an access based on the address first detected will be described. The ADIP address information is superimposed on the wobble signal and hence has a low possibility of being erroneously detected. By contrast, the AUN address information can be appropriately detected only in a recording area having AUN address information appropriately inserted. Since a method of recording a specific pattern may possibly be used, it is not guaranteed that appropriate AUN address information can be always detected. Even during an access based on the AUN address information, if a contradiction with the ADIP address information is detected (namely, if the detected AUN address information and ADIP address information indicate different addresses), the access can be switched to an access based on the ADIP address information. The switching may be performed after re-try processing is performed a prescribed number of times. Even during an access based on the AUN address information, the AUN address information may occasionally become non-detectable because of various reasons. In such a case, the access may be switched to an access based on the ADIP address information. The AUN address information has address information at a higher density than the ADIP address information (FIG. 24). Therefore, when the AUN address information is detected, the access based on the AUN address information can improve the access speed by making a maximum use of the information. When the AUN address information is not detected, the access needs to be switched to an access based on the ADIP address information, needless to say.

The optical disc device 10 (FIG. 1) includes two VCOs, namely, the wobble signal PLL 112 and the data signal PLL 116. Alternatively, the frequency synchronization and the phase synchronization of the wobble signal and the data signal may be performed by one VCO.

In the above example, the reproduction signal processing control is changed for each type of access. The present invention is not limited to this. For example, the reproduction signal processing control may be changed for each area, for example, for each of a user area and a test recording area located in an inner section or an outer section of the disc. The reason for this is that between the user area and the test recording area, the quality or the pattern of the recorded signal may be different. In the case where the physical positions of the user area and the test recording area are known, the reproduction signal processing control may be changed in accordance with the radial position to be accessed.

In the case where the access target area after the address information detection is an OPC area or a defective area, the access may be controlled using either the ADIP address information or the AUN address information which is detected first until the optical head section reaches such a target area, and then the access may be controlled using the ADIP address information address after the optical head section reaches the target area.

From the optical disc device 10 shown in FIG. 12, the ADIP reproduction section 113 and the AUN reproduction section 120 may be deleted.

The optical disc device 10 (FIG. 1, FIG. 12) has been described as a recording and reproduction device, but may be a device specialized for reproduction.

The reproduction signal processor 107, the recording and reproduction control timing section 108 and the CPU 109 may be realized by a semiconductor integrated circuit such as an LSI (Large-Scale Integration) or the like. These elements may be realized by a DSP (Digital Signal Processor), or separated into an LSI and a DSP in accordance with the functions thereof.

Embodiment 3

Figure 18:
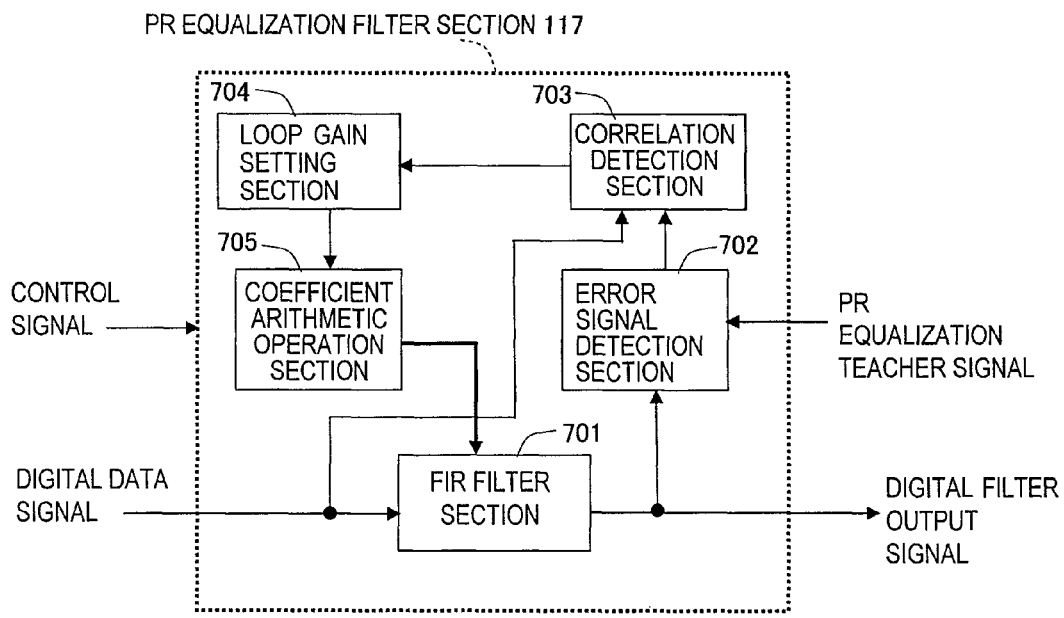
FIG. 18 shows a PR equalization filter section according to an embodiment of the present invention.

Next, a control of the PR equalization filter section 117 included in the optical disc device 10 (FIG. 1) will be described. FIG. 18 shows the PR equalization filter section 117. In this embodiment, the filter coefficient is updated using the LMS algorithm described above. The update control of the filter coefficient is not limited to this, and other algorithms are usable. The PR equalization filter section 117 includes an FIR filter section 701, an error signal detection section 702, a correlation detection section 703, a loop gain setting section 704, and a coefficient arithmetic operation section 705. To the PR equalization filter section 117, a sampling digital data signal and a PR equalization teacher signal which are in phase synchronization with each other are input. The PR equalization filter section 117 performs various operations in accordance with the control signal from the recording and reproduction timing control section 108 (FIG. 1) and outputs a digital filter signal which is filtering-processed as desired.

Figure 23:
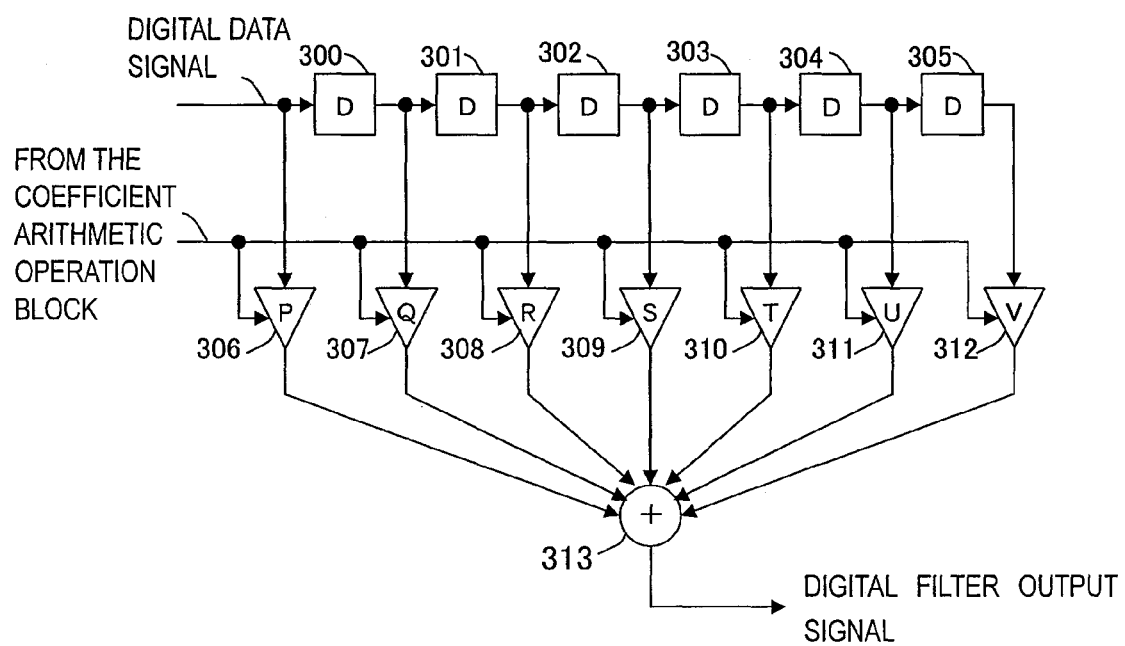
FIG. 23 shows an FIR filter.

The FIR filter section 701 has the same structure as that of the FIR filter shown in FIG. 23. The error signal detection section 702 calculates e(nT) of expression (1) described above and outputs a difference between the input PR equalization teacher signal and the filter output as an error signal. The correlation detection section 703 calculates e(nT)·x(nT) of expression (1). The loop gain setting section 704 multiples A of expression (1) and sets the loop gain of the coefficient updating loop of the PR equalization filter section 117. The coefficient arithmetic operation section 705 updates the filter coefficient based on the error signal from the loop gain setting section 704 and outputs the updated coefficient to the FIR filter section 701.

Figure 19:
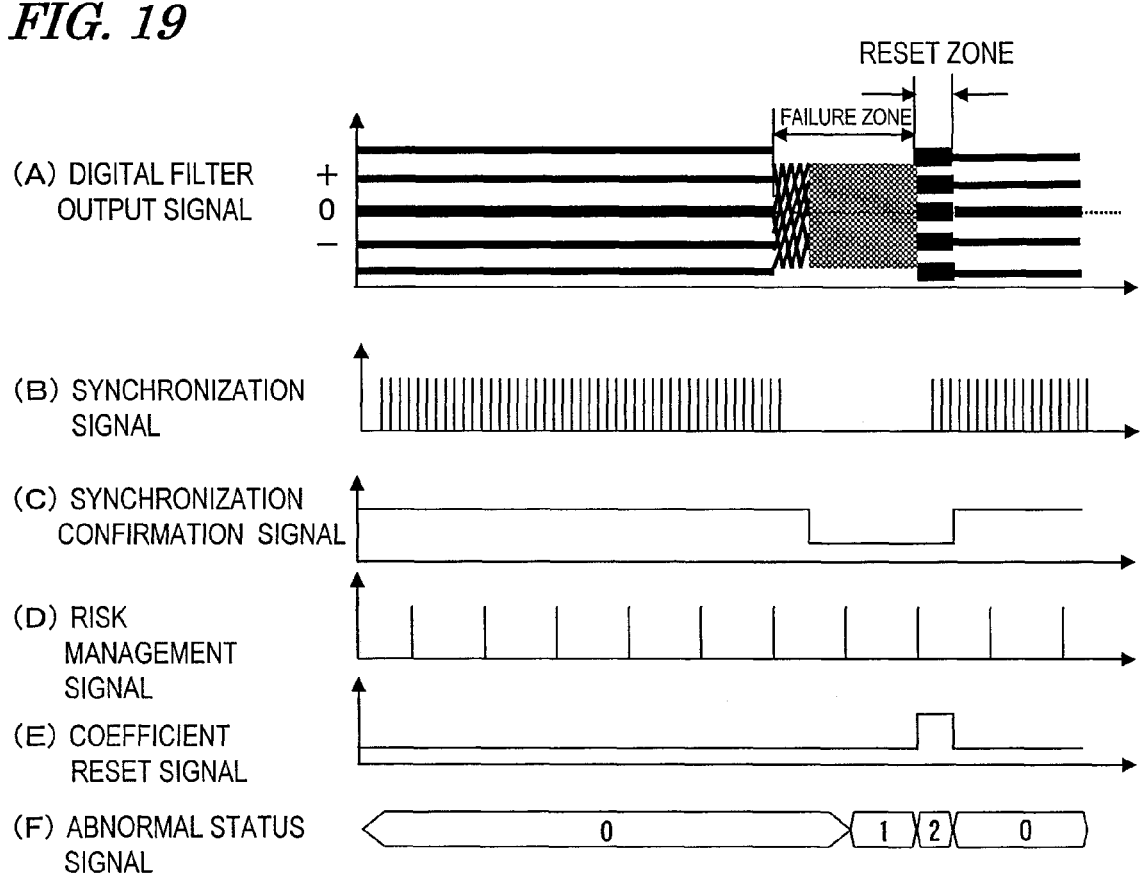
FIG. 19 shows a control operation of the PR equalization filter section according to an embodiment of the present invention.

In the present invention, processing for, when the loop for updating the filter coefficient fails by an external disturbance such as a defect or the like, recovering the loop state to the normal state with no erroneous detection is performed. With reference to FIG. 19, a flow of loop recovery processing will be described. (A) of FIG. 19 shows a digital filter output signal, which is an output signal from the PR equalization filter section 117. In this example, the signal is subjected to PR(1,2,2,1) equalization processing and output as having 7 levels with an equal interval in an amplitude direction. (A) shows a loop failure zone, a reset zone and other normal operation zones. (B) of FIG. 19 shows a detection flag of a synchronization signal, which exhibits a HIGH state when the synchronization signal is detected. The synchronization signal is inserted to the data at an equal interval, for example, every 2000T (T is a channel clock). (C) of FIG. 19 shows a synchronization checking signal, which becomes HIGH when the synchronization signal is detected at a prescribed interval (e.g., every 2000T) continuously a prescribed number of times, and becomes LOW when the synchronization signal is not detected continuously the prescribed number of times. (D) of FIG. 19 shows a risk management signal, which becomes HIGH at an interval which is a multiple of the synchronization signal (e.g., every 8 synchronization signals). (E) of FIG. 19 shows a coefficient reset signal, which puts the loop and the filter coefficient of the adaptive filter to an initial state. The loop and the filter coefficient are reset (put into an initial state) in a HIGH state zone. (F) of FIG. 19 shows an abnormal status signal. The state of the synchronization checking signal is sampled for each risk management signal, and the state of the abnormal status signal is counted and determined. In this example, when the synchronization checking signal becomes LOW at a rise of the risk management signal, the state of the abnormal status signal is counted up from state 0 to state 1, and from state 1 to state 2. After state 2, the coefficient reset signal becomes LOW to put the loop of the adaptive filter into an initial state. After several synchronization zones are passed, the reset state is released to recover the loop operation. This is conducted in order to recover the loop after the optical head section sufficiently passes the defect area, which is the cause of the failure of the loop. The setting of each zone described in this example may be conducted in accordance with the magnitude of the defect which frequently occurs at the time of abnormality. The coefficient reset signal may be controlled using the synchronization checking signal.

According to the present invention, even if the loop of the adaptive filter fails due to an external disturbance such as a defect or the like, the loop operation is recovered after the optical head section passes the defect area sufficiently. By this, the propagation of the failure of the loop is prevented, and thus a stable system can be provided.

The present invention is not limited to the adaptive equalization filter, and is effective to controls having a parameter which is constantly updated. For example, for adaptively changing the expected value of the viterbi decoding section 118 (FIG. 1), the control system according to the present invention can be used to reset the expected value to an initial state and thus to recover the failed control system.

Embodiment 4

The control operation of the PR equalization filter section 117 shown in FIG. 18 will be further described. Here, a control method of updating an initial value of the filter coefficient at every prescribed recording unit will be described.

Figure 5:
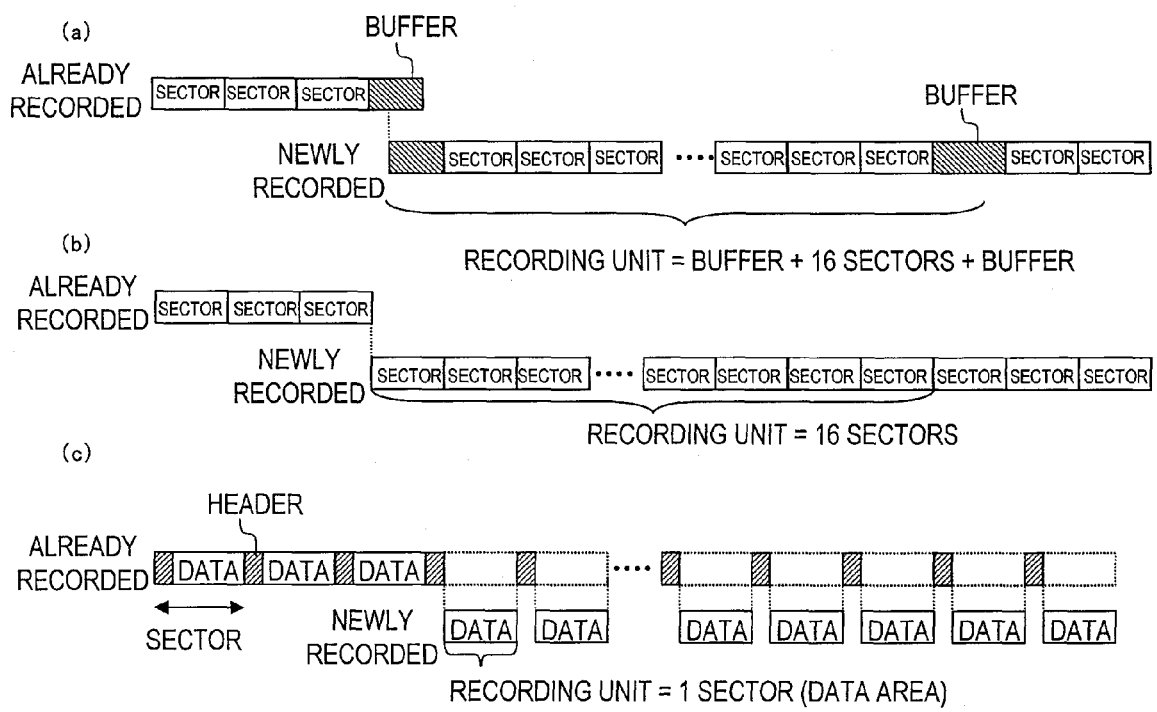
FIGS. 5(a) through (c) show data formats of an optical disc medium.

There are various data formats. Here, with reference to FIG. 5, three examples will be described. FIG. 5(a) shows a data format having a buffer area at every recording unit. A recording unit is formed of a buffer, 16 sectors and a buffer. FIG. 5(b) shows a data format with no buffer area. A recording unit is formed of 16 sectors. FIG. 5(c) shows a data format in which each sector has a head area and a data area. A recording unit is 1 sector.

A buffer area is used for adjusting the recording position for additional recording or used as a test light emitting area for laser light, and there are cases where the recording formats of different buffer areas are completely different. Therefore, the recording state (reproduction state) occasionally may not be guaranteed. For this reason, in a control block for constantly updating the parameter like the adaptive filter, the control loop is put into a hold state in such an area and the hold state is released in the next data area. The filter coefficient is initialized for each data area. In the case where a hold control is performed, if the parameter at the time of holding is not appropriate, reproduction of the next area may be influenced. In the case where initialization (processing of returning to a prescribed certain value) is performed for each data area, the reproduction capability is occasionally deteriorated by the time when the adaptive filter is converged to an appropriate filter coefficient.

Figure 20:
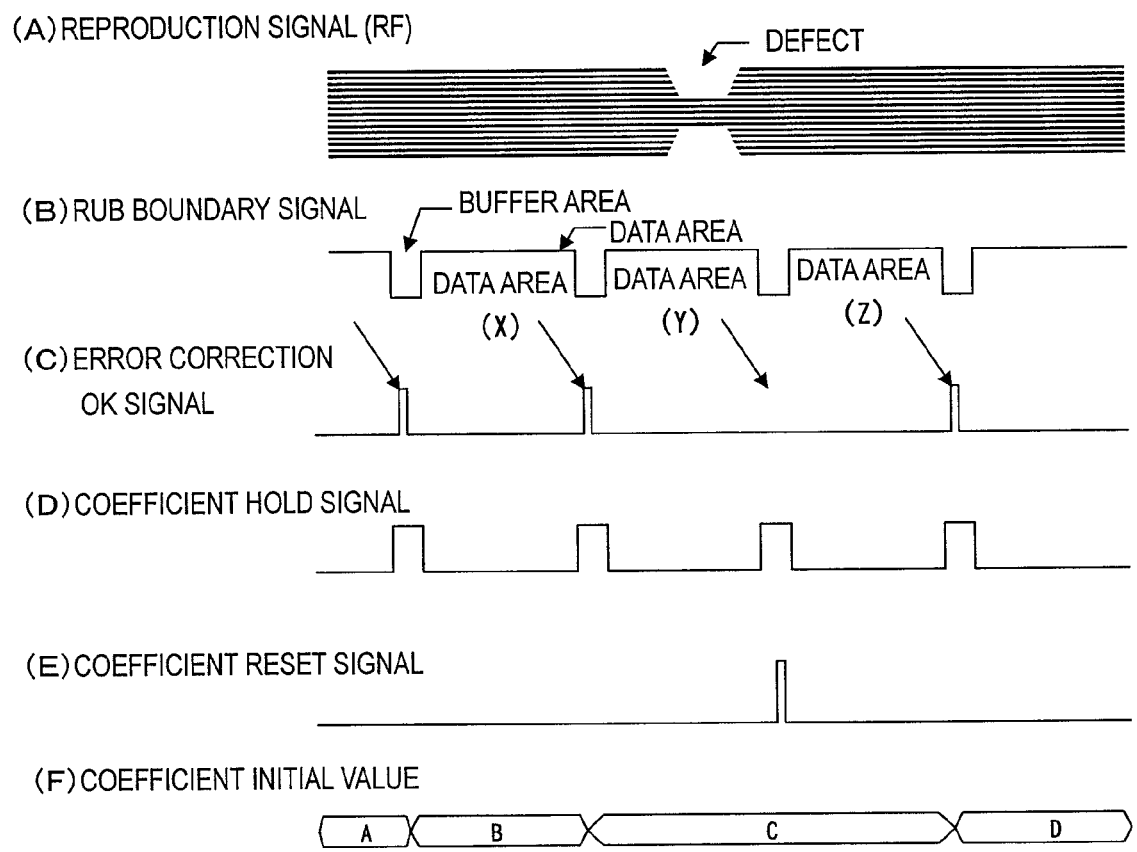
FIG. 20 shows a control operation of the PR equalization filter section according to an embodiment of the present invention.

With reference to FIG. 20, a processing flow of updating the initial value of the filter coefficient will be described. (A) of FIG. 20 shows a reproduction signal. (A) indicates that a defect on a disc such as a scratch, a fingerprint or the like is present in a part of the data area, where the reproduction amplitude is significantly small. (B) of FIG. 20 shows a RUB boundary signal, which is a signal for identifying a buffer area and a data area. (C) of FIG. 20 shows a signal indicating whether error correction was possible or not at the time of reproduction of the data area. When the error correction was possible, the signal becomes HIGH at a prescribed position in the next buffer area. (D) of FIG. 20 shows a signal indicating a zone in which the filter coefficient control is to be in a hold state. When the signal is in a HIGH state, the control loop is held. (E) of FIG. 20 shows a reset signal for returning the filter coefficient to an initial value. (F) of FIG. 20 shows a change in the initial value of the filter coefficient. In this manner, the reproduction state of each data area is checked by an error correction OK signal. When the error correction OK signal becomes HIGH in the coefficient hold zone, the initial value of the filter coefficient is updated. In this case, the filter coefficient is held in the buffer area, and the filter coefficient of one data area is used as an initial value of the next data area. Namely, in the data areas other than the buffer area, the control loop of the adaptive filter is constantly updated without being initialized. By contrast, when the error correction OK signal becomes LOW in the coefficient hold zone, the updating of the initial value of the filter coefficient is stopped, and the coefficient initial value (C) updated in the data area (X) is used as the initial value of the filter coefficient in the data area (Z).

By performing the initial value updating control, the hold control and the reset control of the filter coefficient using the error correction signal in this manner, an optimal filter coefficient can always be used and the reproduction capability can be kept high in any area. The initial value updating value may be a coefficient determined at the end of the data area, or an average value of the values updated in the data area. The average value is not necessarily obtained by averaging all the values, and may be obtained by averaging the coefficients in the zone in which some coefficients are appropriately thinned.

In this example, the error correction signal is used to determine whether or not to perform the initial value updating control, the hold control and the reset control of the filter coefficient, but the present invention is not limited to this. An evaluated value of the reproduction signal may be compared with a prescribed threshold, and the comparison result may be used to perform the initial value updating control, the hold control and the reset control of the filter coefficient. The evaluated value of the reproduction signal needs to be an index value having a correlation with the reproduction capability. Such a value is, for example, a jitter index, an asymmetry index (see, for example, Patent Document No. 5), or a PRML error index (see, for example, Patent Document No. 6). In the case where such a reproduction signal index is used, it is not necessary to use a recording pattern as instructed by the format (capable of performing error correction processing). Therefore, the use of such a reproduction signal index is effective to reproduce an area in which data is recorded with a specific pattern.

The present invention is not limited to adaptive equalization filtering, and is effective to controls having a parameter which is constantly updated.

Figure 21:
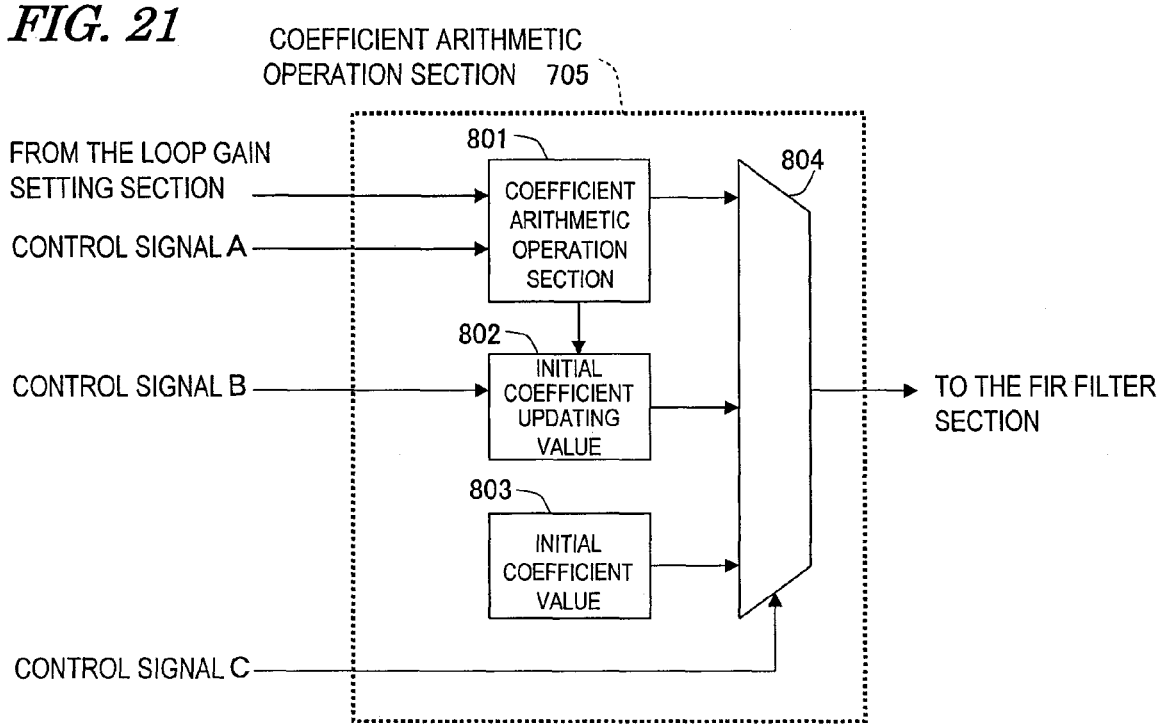
FIG. 21 shows a coefficient arithmetic operation section of the PR equalization filter section according to an embodiment of the present invention.
Figure 22:
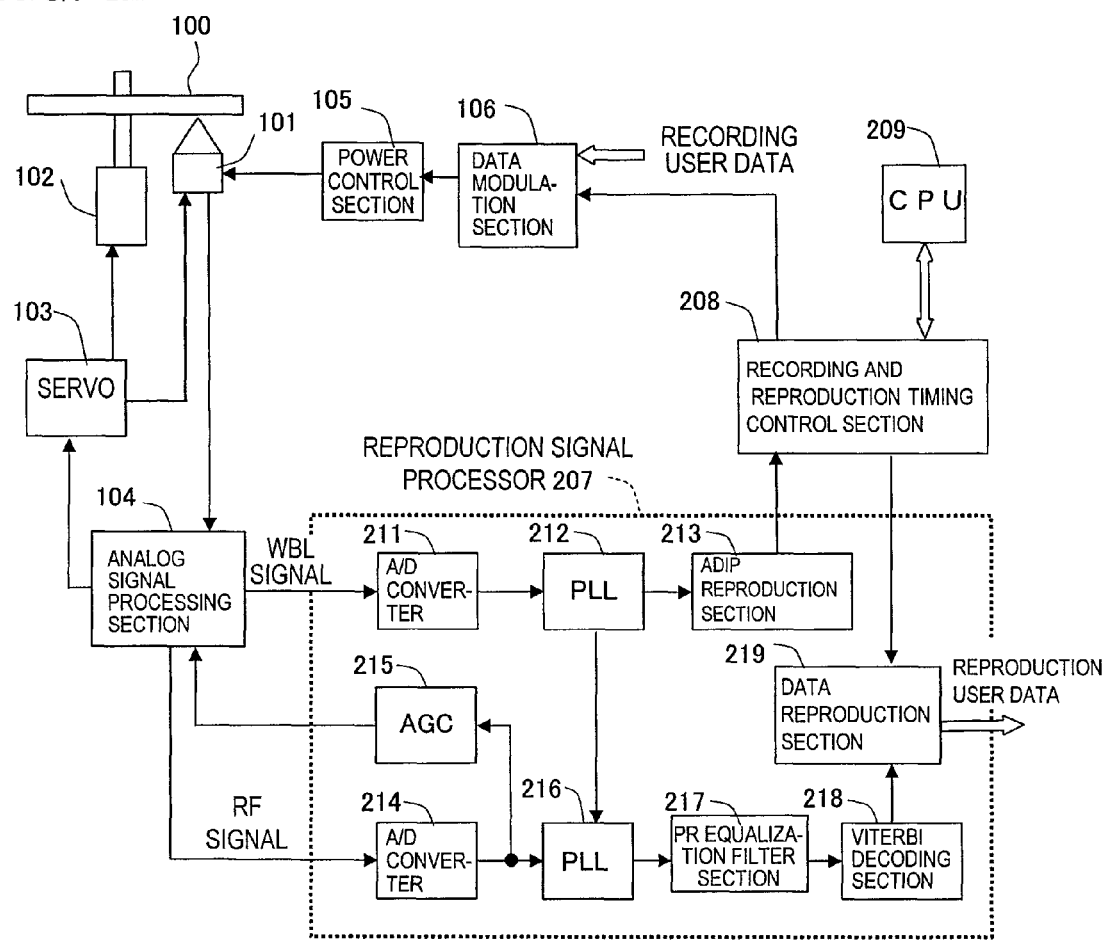
FIG. 22 shows an optical disc device.

In order to realize the present invention, the coefficient arithmetic operation section 705 (FIG. 18) may be controlled. FIG. 21 shows the coefficient arithmetic operation section 705. A coefficient arithmetic operation section 801 calculates a filter coefficient value from the error signal from the loop gain setting section, and turns ON or OFF the hold state using control signal A. An initial coefficient updating value block 802 updates the filter coefficient from the coefficient arithmetic operation section 801 using control signal B. To an initial coefficient value block 803, a set value when the adaptive filter starts operating has been input as an initial value. A selector 804 is controlled by control signal C to output the filter coefficient received from the coefficient arithmetic operation section 801, the initial coefficient updating value block 802 or the initial coefficient value block 803 to the FIR filter section 701 (FIG. 18). Control signal A shown in FIG. 21 corresponds to the coefficient hold signal in (D) of FIG. 20, and control signal B corresponds to an AND signal of the error correction OK signal in (C) and the coefficient hold signal in (D).

As described above, the optical disc device 10 generates a binary signal based on a reproduction signal which is read from a recording medium or a transfer medium while adaptively updating a prescribed coefficient. The coefficient control section holds or resets the prescribed coefficient at a prescribed timing. The reproduction signal evaluation section evaluates the quality of the reproduction signal and controls the coefficient based on the evaluation result of the reproduction signal evaluation section. The reproduction signal evaluation section includes a measuring section for measuring at least one of a jitter value, an asymmetry value, an error correction result, an error rate and a PRML error index value of the reproduction signal. Based on the value measured by the measuring section, the coefficient is held or reset. The adaptive equalization section controls the coefficient of the digital filter based on the LMS (Least Mean Square) algorithm so as to provide a desirable PR (Partial Response) characteristic. The synchronization signal detection section detects a synchronization signal of the reproduction signal, and the interval measuring section measures a prescribed interval. Based on a detection capability of the synchronization signal detected at the prescribed interval, the coefficient control is performed.

Each element of the optical disc device 10 (FIG. 1) according to the present invention may be realized by hardware or software. For example, at least a part of the operations of the reproduction signal processor 107, the recording and reproduction timing control section 108 and the CPU 109 may be realized by a program executable by a computer. These elements are realized by, for example, a semiconductor integrated circuit, a ROM having a program recorded thereon, a RAM having a program (pre)installed thereon, a RAM having a downloaded program installed thereon, etc. or a combination thereof.

The present invention is more effective to an access to a recording medium adopting a finalize-less recording format. Now, finalize and finalize-less will be described.

Finalize is a recording format by which after the latest information is written in a user data area, the entire user data between the lead-in area and the lead-out area is made recorded such that no unrecorded area is left. This is conducted in order to leave no unrecorded area in the recorded area.

The finalize processing is used such that even a reproduction device only compatible with the DVD-ROM format or the like (the format of performing tracking by a DPD signal and detecting an address from pit information) can reproduce DVD-RW/R discs and the like. DVD-RW/R discs adopt a format of having no recording mark in the unrecorded area (address detection is performed by a wobble signal) and performing tracking using a push-pull signal. By the finalize processing, an unrecorded state is made a recorded state, which is very time-consuming.

By contrast, finalize-less is a recording format by which even there is an unrecorded area in the recorded area, the processing of not leaving the unrecorded area is not performed. The present invention can improve the access capability even to a recording medium having a recorded area and an unrecorded area in a mixed state by the finalize-less recording format. For example, the present invention can detect address information at high speed and stably or can perform a stable synchronization pull-in operation as described above.

As described above, an information reproduction device according to the present invention is a device for accessing a recording medium having first address information and second address information recorded thereon. The first address information is represented by a shape formed on the recording medium in advance. The second address information is recorded on the recording medium together with data. The device includes a head section for accessing the recording medium to generate a reproduction signal; a first detection section for detecting the first address information from the reproduction signal; a second detection section for detecting the second address information from the reproduction signal; and a control section for, based on a detection result of either the first detection section or the second detection section which detected the address information first, controlling an access after the detection to the recording medium.

According to an embodiment, the control section controls the access to the recording medium based on the detection result on either the first address information or the second address information which was detected first, until an address within a prescribed range from a target address is reached.

According to an embodiment, the control section changes a number of jumps performed during a movement of the head section, between when the access is made based on the detection result of the first detection section and when the access is made based on the detection result of the second detection section.

According to an embodiment, the recording medium is of a recording format which permits a recorded area and an unrecorded area to be present in a mixed state.

According to an embodiment, the head section moves in a radial direction of the recording medium until reaching the address in the prescribed range from the target address.

According to an embodiment, when an address detected in an accessed area is beyond the target address in the access made based on the detection result of one of the first detection section and the second detection section, the control section switches the access to an access based on the detection result of the other of the first detection section and the second detection section.

According to an embodiment, for controlling a measure access, an unrecorded area detection access and a recording access, the control section uses the detection result of the first detection section after the address within the prescribed range from the target address is reached.

According to an embodiment, in the case where the target address is an address in a test recording area, until the test recording area is reached, the control section controls the access to the recording medium based on the detection result on either the first address information or the second address information which was detected first; and after the test recording area is reached, the control section controls the access based on the detection result on the first address information.

According to an embodiment, when the detection result of the first detection section and the detection result of the second detection section are different from each other after the address within the prescribed range from the target address is reached, the control section controls the access after the detection to the recording medium based on the detection result of the first detection section.

According to an embodiment, the head section moves in a radial direction of the recording medium until reaching the address in the prescribed range from the target address.

According to an embodiment, the control section changes a number of jumps performed during a movement of the head section, between when the access is made based on the detection result of the first detection section and when the access is made based on the detection result of the second detection section.

According to an embodiment, the recording medium is of a recording format which permits a recorded area and an unrecorded area to be present in a mixed state.

According to an embodiment, when an address detected in an accessed area is beyond the target address in the access made based on the detection result of one of the first detection section and the second detection section, the control section switches the access to an access based on the detection result of the other of the first detection section and the second detection section.

An information reproduction method according to the present invention is a method for accessing a recording medium having first address information and second address information recorded thereon. The first address information is represented by a shape formed on the recording medium in advance. The second address information is recorded on the recording medium together with data. The method includes the steps of accessing the recording medium to generate a reproduction signal; detecting the first address information from the reproduction signal; detecting the second address information from the reproduction signal; and based on either the first address information or the second address information which was detected first, controlling an access after the detection to the recording medium.

An access control device according to the present invention is a control device for controlling an access to a recording medium having first address information and second address information recorded thereon. The first address information is represented by a shape formed on the recording medium in advance. The second address information is recorded on the recording medium together with data. Based on either the first address information or the second address information which was detected first, the control device controls an access after the detection to the recording medium.

An access control method according to the present invention is a control method for controlling an access to a recording medium having first address information and second address information recorded thereon. The first address information is represented by a shape formed on the recording medium in advance. The second address information is recorded on the recording medium together with data. The control method includes the step of, based on either the first address information or the second address information which was detected first, controlling an access after the detection to the recording medium.

An access control program according to the present invention is a program for causing a computer to execute control processing of controlling an access to a recording medium having first address information and second address information recorded thereon. The first address information is represented by a shape formed on the recording medium in advance. The second address information is recorded on the recording medium together with data. The control processing includes the step of, based on either the first address information or the second address information which was detected first, controlling an access after the detection to the recording medium.

An information reproduction device according to the present invention is a device for accessing a recording medium having first address information and second address information recorded thereon. The first address information is represented by a shape formed on the recording medium in advance. The second address information is recorded on the recording medium together with data. The device includes a head section for accessing the recording medium to generate a reproduction signal; a first PLL section for generating a first clock signal synchronized to a reproduction signal including the first address information; a second PLL section for generating a second clock signal synchronized to a reproduction signal including the second address information; and a control section for controlling the second PLL section. The second PLL section receives the first clock signal. The control section switches between the reproduction signal and the first clock signal as the signal to which a phase of the second clock signal is to be synchronized.

According to an embodiment, the control section switches between the signals depending on whether the target area of the access is an unrecorded area or a recorded area.

According to an embodiment, the control section switches between the signals depending on whether the accessed position is within or outside the target area of the access.

According to an embodiment, for making a measure access, the control section synchronizes the phase of the second clock signal to the reproduction signal when the accessed position is within the target area of the access, and synchronizes the phase of the second clock signal to the first clock signal when the accessed position is outside the target area of the access.

According to an embodiment, the control section switches between the signals depending on a reproduction state of the data recorded on the recording medium.

According to an embodiment, the control section determines whether the target area of the access is an unrecorded area or a recorded area based on an envelope signal included in the reproduction signal.

According to an embodiment, the control section switches between the signals depending on a reproduction state of the data recorded on the recording medium.

According to an embodiment, the control section switches between the signals depending on whether the accessed position is within or outside the target area of the access.

According to an embodiment, for making a measure access, the control section synchronizes the phase of the second clock signal to the reproduction signal when the accessed position is within the target area of the access, and synchronizes the phase of the second clock signal to the first clock signal when the accessed position is outside the target area of the access.

According to an embodiment, the control section determines whether the target area of the access is an unrecorded area or a recorded area based on an envelope signal included in the reproduction signal.

An information reproduction method according to the present invention is a method for accessing a recording medium having first address information and second address information recorded thereon. The first address information is represented by a shape formed on the recording medium in advance. The second address information is recorded on the recording medium together with data. The method includes the steps of accessing the recording medium to generate a reproduction signal; generating a first clock signal synchronized to a reproduction signal including the first address information; generating a second clock signal synchronized to a reproduction signal including the second address information; and switching between the reproduction signal and the first clock signal as the signal to which a phase of the second clock signal is to be synchronized.

An access control device according to the present invention is a control device for controlling an access to a recording medium having first address information and second address information recorded thereon. The first address information is represented by a shape formed on the recording medium in advance. The second address information is recorded on the recording medium together with data. The control device controls a switch between the reproduction signal from the recording medium and the first clock signal synchronized to the reproduction signal including the first address information as the signal to which a phase of the second clock signal used for data reproduction is to be synchronized.

An access control method according to the present invention is a control method for controlling an access to a recording medium having first address information and second address information recorded thereon. The first address information is represented by a shape formed on the recording medium in advance. The second address information is recorded on the recording medium together with data. The control method includes the step of controlling a switch between the reproduction signal from the recording medium and the first clock signal synchronized to the reproduction signal including the first address information as the signal to which a phase of the second clock signal used for data reproduction is to be synchronized.

An access control program according to the present invention is a program for causing a computer to execute control processing of controlling an access to a recording medium having first address information and second address information recorded thereon. The first address information is represented by a shape formed on the recording medium in advance. The second address information is recorded on the recording medium together with data. The control processing includes the step of controlling a switch between the reproduction signal from the recording medium and the first clock signal synchronized to the reproduction signal including the first address information as the signal to which a phase of the second clock signal used for data reproduction is to be synchronized.

INDUSTRIAL APPLICABILITY

The present invention is especially useful in the technical field of performing data reproduction and reproduction using address information.

The invention claimed is:

1. An information reproduction device for accessing a recording medium having first address information and second address information recorded thereon, wherein:
the first address information is represented by a shape formed on the recording medium in advance;
the second address information is recorded on the recording medium together with data; and
the device comprises:
a head section for accessing the recording medium to generate a reproduction signal;
a first detection section for detecting the first address information from the reproduction signal;
a second detection section for detecting the second address information from the reproduction signal; and
a control section for, based on a detection result of either the first detection section or the second detection section which detected the address information first, controlling an access after the detection to the recording medium.

2. The information reproduction device of claim 1, wherein the control section controls the access to the recording medium based on the detection result on either the first address information or the second address information which was detected first, until an address within a prescribed range from a target address is reached.

3. The information reproduction device of claim 2, wherein the control section changes a number of jumps performed during a movement of the head section, between when the access is made based on the detection result of the first detection section and when the access is made based on the detection result of the second detection section.

4. The information reproduction device of claim 3, wherein the recording medium is of a recording format which permits a recorded area and an unrecorded area to be present in a mixed state.

5. The information reproduction device of claim 4, wherein the head section moves in a radial direction of the recording medium until reaching the address in the prescribed range from the target address.

6. The information reproduction device of claim 5, wherein when an address detected in an accessed area is beyond the target address in the access made based on the detection result of one of the first detection section and the second detection section, the control section switches the access to an access based on the detection result of the other of the first detection section and the second detection section.

7. The information reproduction device of claim 2, wherein for controlling a measure access, an unrecorded area detection access and a recording access, the control section uses the detection result of the first detection section after the address within the prescribed range from the target address is reached.

8. The information reproduction device of claim 2, wherein in the case where the target address is an address in a test recording area, until the test recording area is reached, the control section controls the access to the recording medium based on the detection result on either the first address information or the second address information which was detected first; and after the test recording area is reached, the control section controls the access based on the detection result on the first address information.

9. The information reproduction device of claim 2, wherein when the detection result of the first detection section and the detection result of the second detection section are different from each other after the address within the prescribed range from the target address is reached, the control section controls the access after the detection to the recording medium based on the detection result of the first detection section.

10. The information reproduction device of claim 2, wherein the head section moves in a radial direction of the recording medium until reaching the address in the prescribed range from the target address.

11. The information reproduction device of claim 1, wherein the control section changes a number of jumps performed during a movement of the head section, between when the access is made based on the detection result of the first detection section and when the access is made based on the detection result of the second detection section.

12. The information reproduction device of claim 1, wherein the recording medium is of a recording format which permits a recorded area and an unrecorded area to be present in a mixed state.

13. The information reproduction device of claim 1, wherein when an address detected in an accessed area is beyond the target address in the access made based on the detection result of one of the first detection section and the second detection section, the control section switches the access to an access based on the detection result of the other of the first detection section and the second detection section.

14. An information reproduction method for accessing a recording medium having first address information and second address information recorded thereon, wherein:
the first address information is represented by a shape formed on the recording medium in advance;
the second address information is recorded on the recording medium together with data; and
the method comprises the steps of:
accessing the recording medium to generate a reproduction signal;

detecting the first address information from the reproduction signal;
detecting the second address information from the reproduction signal; and
based on either the first address information or the second address information which was detected first, controlling an access after the detection to the recording medium.

15. A device for controlling an access to a recording medium having first address information and second address information recorded thereon, wherein:
the first address information is represented by a shape formed on the recording medium in advance;
the second address information is recorded on the recording medium together with data; and
the device comprises:
a first detection section for detecting the first address information based on a reproduction signal from the recording medium;
a second detection section for detecting the second address information based on the reproduction signal; and
a control section for, based on a detection result of either the first detection section or the second detection section which detected the address information first, controlling an access after the detection to the recording medium.

16. An access control method for controlling an access to a recording medium having first address information and second address information recorded thereon, wherein:
the first address information is represented by a shape formed on the recording medium in advance;
the second address information is recorded on the recording medium together with data; and
the control method comprises the step of, based on either the first address information or the second address information which was detected first, controlling an access after the detection to the recording medium.

17. An access control program stored on a non-transitory machine-readable medium which, when executed by a computer, causes the computer to execute control processing of controlling an access to a recording medium having first address information and second address information recorded thereon, wherein:
the first address information is represented by a shape formed on the recording medium in advance;
the second address information is recorded on the recording medium together with data; and
the control processing comprises the step of, based on either the first address information or the second address information which was detected first, controlling an access after the detection to the recording medium.

18. An information reproduction device for accessing a recording medium having first address information and second address information recorded thereon, wherein:
the first address information is represented by a shape formed on the recording medium in advance;
the second address information is recorded on the recording medium together with data; and
the device comprises:
a head section for accessing the recording medium to generate a reproduction signal;
a first PLL section for generating a first clock signal synchronized to a reproduction signal including the first address information;
a second PLL section for generating a second clock signal synchronized to a reproduction signal including the second address information; and
a control section for controlling the second PLL section;
wherein:
the second PLL section receives the first clock signal;
the control section switches between the reproduction signal and the first clock signal as the signal to which a phase of the second clock signal is to be synchronized;
the control section switches between the signals depending on whether the target area of the access is an unrecorded area or a recorded area; and
the control section switches between the signals depending on whether the accessed position is within or outside the target area of the access.

19. The information reproduction device of claim 18, wherein for making a measure access, the control section synchronizes the phase of the second clock signal to the reproduction signal when the accessed position is within the target area of the access, and synchronizes the phase of the second clock signal to the first clock signal when the accessed position is outside the target area of the access.

20. The information reproduction device of claim 19, wherein the control section switches between the signals depending on a reproduction state of the data recorded on the recording medium.

21. The information reproduction device of claim 20, wherein the control section determines whether the target area of the access is an unrecorded area or a recorded area based on an envelope signal included in the reproduction signal.

22. An information reproduction device for accessing a recording medium having first address information and second address information recorded thereon, wherein:
the first address information is represented by a shape formed on the recording medium in advance;
the second address information is recorded on the recording medium together with data; and
the device comprises:
a head section for accessing the recording medium to generate a reproduction signal;
a first PLL section for generating a first clock signal synchronized to a reproduction signal including the first address information;
a second PLL section for generating a second clock signal synchronized to a reproduction signal including the second address information; and
a control section for controlling the second PLL section;
wherein:
the second PLL section receives the first clock signal;
the control section switches between the reproduction signal and the first clock signal as the signal to which a phase of the second clock signal is to be synchronized; and
the control section switches between the signals depending on whether the accessed position is within or outside the target area of the access.

23. The information reproduction device of claim 22, wherein for making a measure access, the control section synchronizes the phase of the second clock signal to the reproduction signal when the accessed position is within the target area of the access, and synchronizes the phase of the second clock signal to the first clock signal when the accessed position is outside the target area of the access.

24. An information reproduction device for accessing a recording medium having first address information and second address information recorded thereon, wherein:
- the first address information is represented by a shape formed on the recording medium in advance;
- the second address information is recorded on the recording medium together with data; and
- the device comprises:
  - a head section for accessing the recording medium to generate a reproduction signal;
  - a first PLL section for generating a first clock signal synchronized to a reproduction signal including the first address information;
  - a second PLL section for generating a second clock signal synchronized to a reproduction signal including the second address information; and
  - a control section for controlling the second PLL section;

wherein:
- the second PLL section receives the first clock signal;
- the control section switches between the reproduction signal and the first clock signal as the signal to which a phase of the second clock signal is to be synchronized;
- the control section switches between the signals depending on whether the target area of the access is an unrecorded area or a recorded area; and
- the control section determines whether the target area of the access is an unrecorded area or a recorded area based on an envelope signal included in the reproduction signal.

* * * * *

UNITED STATES PATENT AND TRADEMARK OFFICE
CERTIFICATE OF CORRECTION

PATENT NO.         : 8,004,945 B2
APPLICATION NO.    : 12/282439
DATED              : August 23, 2011
INVENTOR(S)        : Harumitsu Miyashita et al.

It is certified that error appears in the above-identified patent and that said Letters Patent is hereby corrected as shown below:

Page 2, right column, line 7,
        "JP 2004-134009 2/2004" should be deleted (incorrect date) Correct date
        included with IDS submission of Oct. 10, 2008.

Signed and Sealed this
Fourteenth Day of February, 2012

David J. Kappos
*Director of the United States Patent and Trademark Office*